United States Patent
Landolt

(10) Patent No.: US 6,525,754 B2
(45) Date of Patent: Feb. 25, 2003

(54) PHOTOGRAPHIC RECORDING DEVICE WITH AUTOMATIC LOADING AND UNLOADING OF A BAND-SHAPED MEDIUM

(75) Inventor: Markus Landolt, Zürich (CH)

(73) Assignee: Gretag Imaging Trading AG, Wettingen (CH)

(*) Notice: Subject to any disclaimer, the term of this patent is extended or adjusted under 35 U.S.C. 154(b) by 0 days.

(21) Appl. No.: 10/004,047

(22) Filed: Oct. 31, 2001

(65) Prior Publication Data

US 2002/0057914 A1 May 16, 2002

(30) Foreign Application Priority Data

Nov. 7, 2000 (EP) .............................. 00123478

(51) Int. Cl.[7] .......................... G03G 15/00; H04N 1/00; G03B 27/58
(52) U.S. Cl. ................. 347/139; 347/262; 347/264; 346/136; 242/535; 355/47; 355/72; 358/302
(58) Field of Search .................. 355/47, 72, 73; 347/104, 139, 153, 157, 262, 264; 358/302, 304; 346/136; 242/535

(56) References Cited

U.S. PATENT DOCUMENTS

| | | | |
|---|---|---|---|
| 3,829,208 A | * 8/1974 | van Meijel et al. | 399/161 |
| 3,974,974 A | * 8/1976 | Nishikawa | 242/422.4 |
| 4,033,575 A | 7/1977 | Fujimoto | |
| 4,179,118 A | 12/1979 | Huss | |
| 4,259,695 A | 3/1981 | Nakano | |
| 4,707,712 A | * 11/1987 | Buckley et al. | 346/104 |
| 4,769,652 A | 9/1988 | Cleary et al. | |
| 6,204,871 B1 | * 3/2001 | Keller et al. | 347/139 |

FOREIGN PATENT DOCUMENTS

EP    1 009 158 A1    6/2000

* cited by examiner

Primary Examiner—Alan A. Mathews
(74) Attorney, Agent, or Firm—Weingarten, Schurgin, Gagnebin & Lebovici LLP

(57) ABSTRACT

The invention relates to a photographic recording arrangement for the recording of photographic images onto a band-shaped medium, with a medium source which a supplies a band-shaped medium, with a clamping arrangement which provides a clamping track and a band-shaped medium output at the beginning of the track through which the band-shaped medium is supplied by the medium source along which clamping track the band-shaped medium is guided and tightened and at the end of which track the guided band-shaped medium is clamped by a first holding mechanism for tightening, with at least one recording apparatus for the recording of images onto the tightened band-shaped medium. The device further includes a second holding mechanism which can clamp the band-shaped medium and is moveable relative to the clamping arrangement, a transport mechanism which is constructed for transferring the band-shaped medium between the first and the second holding mechanisms, when the first holding mechanism by movement of the clamping arrangement relative to the second holding mechanism has been brought into a first preselected position relative to the second holding mechanism; and a control which is constructed for the transfer of the band-shaped medium in such a way that it actuates one of the two holding mechanisms for release of the clamped band-shaped medium and, in the first preselected position, actuates the transfer mechanism in order to transfer the released band-shaped medium from one of the two holding mechanisms to the other.

16 Claims, 22 Drawing Sheets

PHOTOGRAPHIC RECORDING DEVICE WITH AUTOMATIC LOADING AND UNLOADING OF A BAND-SHAPED MEDIUM

FIELD OF THE INVENTION

The present invention relates to photographic recording devices for the recording of photographic images onto a medium, especially onto a band-shaped medium. The invention relates in particular to drum recording devices wherein a band-shaped medium is clamped on a drum for the recording of photographic images onto the band-shaped medium.

BACKGROUND ART

Such a drum recording device is known from EP 1 009 158 A1.

The recording device known from EP 1 009 158 A1 is shown in FIG. 18. The recording device includes as clamping arrangement a clamping drum 1100 as first holding mechanism a fastening means 1160 for the fastening of a recording medium M onto the mantle 1110 of the clamping drum and a recording unit 1200 stationary relative to the direction of rotation of the clamping drum. The recording unit 1200 records onto the recording medium imaging information which is supplied thereto in the form of electrical signals, which medium is fastened onto the mantle of the rotating clamping drum 1100. Mounting means 1120 or a roll 1130 functioning as a medium source are provided in the interior of the clamping drum 1100, onto which a supply of recording medium M is wound into a roll. The clamping drum 1100 includes in its mantle 1110 a break in the clamping track in the form of a slit 1140 through which the recording medium M is first guided from the interior of the clamping drum 1100 onto its mantle 1110 and then fastened thereon.

The fastening means are constructed as a clamping arrangement which includes two carrier arms, 1161 and 1162 positioned closely to the two sides of the mantle 1110 and a clamping bar 1163 connecting them. The clamping bar extends transverse over the width of the clamping track or the clamping drum 1100. A knife bar 1170 is also mounted on the two carrier arms 1161, 1162 and extends transverse to the mantle 1110. It functions as a cutting device. The knife bar is moveable together with the clamping bar 1163. The clamping bar 1163 is biased against the surface of the mantle 1110 by not illustrated springs and thereby clamps the recording medium M positioned thereunder onto the mantle 1110 of the clamping drum 1100.

An actuating device 1180 is provided opposite the recording unit 1200 and stationary in a not illustrated frame. The actuating arrangement is controlled by the control 1300 and activates the clamping arrangement 1160 and the cutting arrangement 1170, when the clamping drum 1100 is in a predefined rotational position in which the actuating arrangement 1180 is opposite the clamping arrangement 1160 and can be brought into engagement therewith. At the same location and also stationary in a not illustrated frame is provided a drive arrangement 1190 which in the mentioned rotational position of the clamping drum 1100 is brought into contact with the recording medium M on the mantle 1110 under the control of the control 1300 and provides for the advancement of the recording medium M in direction of rotation of the clamping drum 1100 relative to the mantle 1110.

As shown in the detailed illustration of FIG. 19, the drive arrangement 1190 essentially includes a drive roller 1192 rotatably mounted in a pivotable frame 1191 which is driven by a motor 1194 connected with a control 1300 and by way of a belt 1193. The pivotable frame 1191 is mounted stationary in a not illustrated frame and can be moved to and from the mantle 1110 by way of an only symbolically illustrated excenter mechanism 1195–1196, whereby the drive roller 1192 is brought into contact with the recording medium M supported on the mantle or is lifted off therefrom. The clamping arrangement 1160 and the cutting arrangement 1170 connected therewith are also operated by the same excenter mechanism 1195–1196. The excenter mechanism 1195–1196 is driven by another not illustrated stationary motor which in turn is connected with the control 1300 and controlled thereby.

The function of the recording device is as follows.

After the fastening of the storage roller 1130 of recording medium M onto the clamping pin 1120 in the interior of the clamping drum 1100, the start of the band shaped recording medium M is manually guided between the clamping roller pair 1152–1153 through the slit 1140 to the outside, around the mantle 1110 of the clamping drum 1100 and clamped down by the clamping arrangement 1150. The drive arrangement 1190 is in an inactive position in which the drive roller 1192 is lifted off the mantle 1110. In this manner, the recording medium M is clamped on the clamping drum 1100 and the device is ready for the recording procedure (FIG. 19).

The clamping drum 1100 is now rotated in direction of the arrow D together with the recording medium M and the image information to be recorded is recorded in a known manner by way of the recording unit 1200 onto the section of the recording medium M located on the mantle 1110 or under a part thereof. When the recording process is finished, the clamping drum is stopped in the above mentioned, defined rotational position (park position).

As illustrated in FIG. 20, the drive arrangement 1190 is now lowered onto the mantle 1110 so that the drive roller 1192 comes into contact with the recording medium M on the mantle. At the same time or immediately thereafter, the clamping arrangement 1160 together with the knife bar 1170 are lifted off the mantle 1110 so that the recording medium M is at this location held against the mantle 1110 only by the drive roller 1192.

The printed (image carrying) portion of the recording medium M is now ejected (FIG. 21). For this purpose, the drive roller 1192 is rotated and the recording medium band M advanced in the rotational direction of the clamping drum 1100 under and past the knife bar 1170 until the rear end of the printed portion is located under the knife bar 1170.

The clamping arrangement 1160 together with the knife bar 1170 connected therewith is thereafter pressed against the mantle 1110 and at the same time or immediately thereafter the drive arrangement 1190 is lifted off the mantle 1110. By way of the downwards movement (relative to the drum radially inward) of the clamping arrangement 1160 and the knife beam 1170, the printed portion of the medium is cut off and the new front end of the still unprinted medium is clamped onto the clamping drum. The device is now ready for the next recording process (FIG. 22).

The problem of an automatic loading or unloading is not solved in the above recording device.

SUMMARY OF THE INVENTION

It is now an object of the invention to provide a photographic recording device, which can be automatically loaded with a band-shaped medium or unloaded.

This object is achieved through a second holding mechanism which can clamp a band-shaped medium and relative to which the clamping arrangement can be moved, and a transport mechanism for transporting the band-shaped medium between the first and second holding mechanisms. A control is provided for the transfer of the band-shaped medium by operating one holding mechanism for releasing the band-shaped medium and activating the transport mechanism in a first preselected position for transporting the released band-shaped medium to the other holding mechanism.

The photographic recording device in accordance with the invention is used for the recording of photographic images onto a band-shaped medium. The band-shaped medium can be, for example, regular paper, light sensitive photographic paper, thermal paper or plastic foils etc. The recording of the photographic images onto the band-shaped medium is carried out with a recording unit suitable for the respective medium. For example, it can be an inkjet-recording unit which applies ink onto the regular paper. A recording unit can also apply toner onto regular paper, for example. The recording unit can also be constructed for the exposure of a light sensitive medium, for example, photographic paper. For this purpose the recording unit can include, for example, laser or light emitting display devices (cathode ray tubes, LCD displays). The recording unit can also apply the photographic images onto the medium by heat, for example, with a thermal head in cooperation with thermal paper.

The band-shaped medium is supplied from a medium source. The latter can be, for example, a roll from which the band-shaped medium is unwound. However, the band-shaped medium can also be present in folded condition, for example. The band-shaped medium can also be housed in a cassette.

The photographic recording device preferably includes a clamping arrangement which provides a clamping track along which the band-shaped medium can be clamped down. The clamping arrangement is preferably a clamping drum, whereby the clamping track extends especially along a circle. The advantage of a circular clamping track resides in that upon rotation of the clamping arrangement and with a stationary recording unit, a constant spacing is guaranteed between the clamped down band-shaped medium and the recording unit. However, other clamping arrangements can also be used, which, for example, provide a clamping track wherein several linear clamping sections are aligned in series. For example, a polygonal or multi-sided clamping arrangement can be realized wherein one recording unit is respectively associated with one portion of the track and can be carried along the latter for the recording of an image. Several images can be recorded in parallel thereby along the clamping track. After the parallel recording, the clamping arrangement can then be, for example, moved or rotated in order to record images on the remaining portions.

The clamping track has a beginning which is constructed to receive the band-shaped medium. The medium source and the beginning of the clamping track are positioned so that the band-shaped medium can be guided to the track beginning. The clamping track is constructed so that the band-shaped medium can be guided and clamped down along the clamping track. For example, the clamping track is constructed as a cylindrical mantle track on which the band-shaped medium can glide and which gives the band-shaped medium a circular shape during the clamping thereof. Alternatively, the clamping arrangement can form the clamping track, for example, by way of a framework whereby the band-shaped medium is tightened between the framework sections.

If several recording units are provided which are moveable independently of one another for the recording of the images, this results in the advantage that each recording unit can optimize and thus accelerate the recording process by an individual scanning process depending on the respective image data.

A first holding mechanism is preferably provided at the end of the track. This provides for the fastening of the band-shaped medium at the end of the track in order to tighten it along the clamping track. The tightening is carried out, for example, in that the band-shaped medium is transported back to the medium source or in that a loop is formed between the medium source and the start of the track until the band-shaped medium is taut.

The clamping arrangement is preferably moveable relative to the recording apparatus or several recording apparatus, preferably rotatable relative thereto, for the recording of the images on the tightened band-shaped medium in cooperation with the recording apparatus. The clamping arrangement, for example, a clamping drum, is preferably rotatably supported relative to the recording apparatus and the at least one recording apparatus is stationary. However, this can also be achieved in reverse so that the recording apparatus is moveable and the clamping arrangement is stationary. Finally, both the clamping arrangement as well as the at least one recording apparatus can be moveably supported to achieve a relative movement between the recording apparatus and the clamping arrangement for the recording of the images.

The movement of the clamping arrangement in accordance with the invention preferably also allows for the loading of the clamping arrangement with the band-shaped medium. Thus it preferably fulfills a dual function, since it is preferably used both for the recording as well as the loading.

Apart from the first holding mechanism, a second holding mechanism is preferably provided relative to which the clamping arrangement is moveable. The second holding mechanism is preferably stationary and the clamping arrangement can be moved relative to the second holding mechanism, especially rotated. The second holding mechanism is constructed to fasten a band-shaped medium. The second holding mechanism is preferably positioned on one side of the clamping track, for example, outside the clamping drum, while the medium source is positioned on the other side of the clamping track, for example in the interior of the clamping drum. The band-shaped medium preferably guidable through a break in the clamping track between the beginning and the end of the track and from the medium source to the second holding mechanism. This break can be, for example, a slit in the clamping drum. The clamping track is preferably also constructed such that the end of the track is closer to the beginning than to the middle of the track.

A transport mechanism is preferably provided, for example, a transport roller, which transfers a force onto the band-shaped medium for the transport thereof to slide it along the clamping track. The transport mechanism is positioned so that it transports the band-shaped medium between the first and second holding mechanisms, when the clamping arrangement is in a preselected position (first preselected position) relative to the second holding mechanism. The clamping arrangement is herefor moved relative to the second holding mechanism, especially rotated. In feeding direction of the band-shaped medium, the transport mechanism can preferably be brought into contact with the band-shaped medium and removed therefrom before the end of the track, especially at or in the vicinity of the first holding mechanism, especially directly at the input region of the latter for a front end of the band-shaped medium.

A control is provided in accordance with the invention. The control serves especially for the transfer of a band-shaped medium between the first and the second holding mechanisms. The control is preferably constructed in such a way that the band-shaped medium can be transferred thereby from the first holding mechanism to the second holding mechanism as well as from the second holding mechanism to the first holding mechanism. The transport mechanism is used for the transfer of the band-shaped medium and is actuated by the control in the first preselected position. In this first preselected position, the first holding mechanism, the transport mechanism and the second holding mechanism are in a preselected relative position. For the transfer, one of the two holding mechanisms is actuated to release the band-shaped medium held thereby. The control then activates the transport mechanism in order to transport the released band-shaped medium to the other of the two holding mechanisms. The transport of the band-shaped medium is preferably continued until the other of the two holding mechanisms can capture or hold the band-shaped medium.

The transport mechanism preferably can be moved away from the band-shaped medium when not used for the transporting so that the clamping arrangement can be freely moved, i.e. no contact exists between the band-shaped medium and the transport mechanism when the clamping arrangement is moved, especially rotated. The transport mechanism can be brought into contact with the band-shaped medium for the transport thereof. The transport mechanism is preferably mounted relative to the clamping arrangement such that the clamping arrangement can be moved relative to the transport mechanism, especially rotated. Especially, the transport mechanism is stationary while the clamping arrangement is rotatably constructed, for example. The transport mechanism can also be constructed so that it moves together with the clamping arrangement. However, a stationary positioning of the transport mechanism relative to the clamping arrangement is preferred in view of easier loading of the clamping arrangement as described later on, whereby the transport mechanism then can preferably be coupled with the first holding mechanism in a certain position, as will be described in more detail further below.

The clamping arrangement preferably moves about an axis, while the transport mechanism and a second holding mechanism are stationary. The width direction of the band-shaped medium is preferably at least about parallel to the axis. The clamping track is preferably guided about the axis in such a way that a track opening results intermediate the track beginning and the track end through which a band-shaped medium supplied from the medium source can be conveyed.

An internal medium conveyor is preferably provided and positioned such that it passes a band-shaped medium supplied by the medium source through the track opening. The internal medium conveyer is thereby preferably constructed such that it transports the band-shaped medium to the second holding mechanism so that the second holding mechanism can capture the band-shaped medium, when the clamping arrangement is in a certain position (second preselected position) relative to the second holding mechanism. The second preselected position preferably at least corresponds with the above already mentioned first preselected position. To achieve that, the internal medium conveyer preferably not only includes a convenient mechanism for actively transferring a transporting force onto the band-shaped medium (for example transport rollers) but also a guide which guides the transported band-shaped medium towards the second holding mechanism when the clamping arrangement is in the second preselected position. This guide is preferably constructed such that the band-shaped medium is advanced towards the beginning of the track when it is transported away from the medium source by the internal conveyer.

The guide of the internal medium conveyer preferably cooperates with a second guide in order to direct the band-shaped medium in the desired direction. The second guide can be mechanically connected, for example, with the first holding mechanism. The second guide especially can be placed at different positions, up the control of the controller. This is further described further below.

The transporting of the band-shaped medium by the internal medium conveyor from the medium source through the track opening and through the second holding mechanism allows for an automatic loading of the clamping arrangement in that the second holding mechanism clamps the band-shaped medium while the clamping arrangement is rotated. During the rotation, the band-shaped medium is conveyed from the medium source by the internal medium conveyor. The band-shaped medium is thereby again preferably at least about parallel to the axis of rotation. The internal medium conveyor and the second holding mechanism are correspondingly constructed therefor.

The rotation preferably ends when the track end has reached the preselected position relative to the second holding mechanism. The first holding mechanism is also preferably located at this track end. In this first preselected position, the transfer of the band-shaped medium guided along the clamping track from the second holding mechanism which still holds the band-shaped medium (front end of the band-shaped medium) to the first holding mechanism can then take place. In this position, the band-shaped medium extends from the medium source through the internal medium conveyor to the beginning of the track, along the clamping track, and beyond the end of the track to the second holding mechanism. The control is constructed such that it causes the transfer of the band-shaped medium from the second holding mechanism to the first holding mechanism. The second holding mechanism is therefor actuated to release the held band-shaped medium and the transport mechanism is actuated to reverse transport the band-shaped medium (the front end of the band-shaped medium) against the medium supply direction so that -the front end approaches the first holding mechanism.

Once the band-shaped medium, especially the front end of the band-shaped medium is in the vicinity of the first holding mechanism, the first holding mechanism is actuated to capture the front end. The front end of the band-shaped medium is herefor first preferably transported against the supply direction by the transport mechanism and past the first holding mechanism. The first holding mechanism is then opened (second loading position), so that it can receive the front end. The band-shaped medium is subsequently again advanced in supply direction until the front end of the band-shaped medium can be captured by the first holding mechanism. The first holding mechanism is then closed (first loading position) to hold the front end of the band-shaped medium.

When the band-shaped medium, especially its front end, is held by the first holding mechanism at the end of the track, the band-shaped medium is transported by the transport mechanism and/or the internal medium conveyor in reverse of the band-shaped medium supply direction to tighten the band-shaped medium along the clamping track.

When the band-shaped medium is transferred from the internal medium conveyor to the second holding mechanism, the clamping arrangement takes up a similar rotational position as when the band-shaped medium is transferred from the second holding mechanism to the first holding mechanism. Thus, the first preselected position preferably corresponds with the second preselected position in such a way that for the loading of the clamping track with the band-shaped medium the clamping arrangement carries out about one full rotation or more.

Once the band-shaped medium is taut on the clamping arrangement, the recording of the images on the band-shaped medium is carried out by way of the at least one recording apparatus. The clamping arrangement is preferably rotated herefor while the at least one recording apparatus remains stationary. A complete revolution of the band-shaped medium is again preferably carried out herefor. This rotation is not impeded by the transport mechanism since the latter is actuated by the control to be out of contact with the band-shaped medium during the recording process and the rotation required therefor. Once a number of complete rotations has been carried out or a number of rotations were carried out until the clamping arrangement is again in the first preselected position, and if the recording is complete, a transfer of the band-shaped medium is carried out, especially the front end of the band-shaped medium, from the first to the second holding mechanism by way of the control for the unloading of the band-shaped medium provided with the images from the clamping arrangement. Several rotations are preferably carried out for the recording process, for example, for a line-by-line recording.

For the transfer from the first holding mechanism to the second holding mechanism, the transport mechanism is again brought into contact with the band-shaped medium and the first holding mechanism is opened in order to release the front end of the band-shaped medium. The band-shaped medium is then transported by way of the transport mechanism from the first holding mechanism to the second holding mechanism. This is preferably supported by a guide which may correspond with the rear surface of the already above-mentioned further guide. This guide is then preferably moved into an active position in which it guides the band-shaped medium from the first holding mechanism to the second holding mechanism when the first holding mechanism is opened.

A cutting device is preferably provided which severs the band-shaped medium when it has been conveyed or unloaded from the clamping arrangement for a preselected length. The cutting device is preferably mechanically connected with the clamping arrangement and thus rotates therewith. However, it can also be mounted stationary. In order to unload the band-shaped medium for the preselected length, the second holding mechanism is preferably also constructed for a conveying of the band. For example, it can be provided with a part of rollers between which the band is held when the rollers are not rotated and conveyed when the rollers are rotated.

The first holding mechanism preferably includes the cutting device (first cutting device) and/or is mechanically coupled therewith. A mechanic coupling is preferably achieved in such a way that the band-shaped medium is severed when the first holding mechanism is moved from the open position (second loading position) into the closed position (first loading position).

Once the band-shaped medium has been transported off the clamping arrangement for a preselected length for the unloading thereof, it is preferably transferred from the second holding mechanism to a third holding mechanism. A second cutting device is preferably positioned after this third holding mechanism which preferably is also adapted for the conveying of the band-shaped medium. The second cutting device is used for dividing the band-shaped medium into subsections which preferably respectively include one picture. The severing by way of the second cutting device is preferably carried out only when the first cutting device has already severed the band-shaped medium. A further transport of the (severed) band-shaped medium from the third holding mechanism to the second cutting device is also preferably carried out only then. The second and third holding mechanisms are preferably spaced from one another in such a way that a loop of the band-shaped medium is formed therebetween before the (severed) band-shaped medium is fully transported from the third holding mechanism to the second cutting device. In other words, the distance between the second and third holding mechanisms is preferably shorter than the length of the severed band-shaped medium (for example less than ½, ¼ or ¹⁄₁₀ of the length), which at least about corresponds with the length of the clamping track. An especially compact recording device can be achieved in this manner.

The first holding mechanism can preferably be brought into a position (first loading position) in which it does not interfere with the transfer between the first holding mechanism and the second holding mechanism. This is advantageous especially during the loading of the clamping arrangement. The first holding mechanism is therefor preferably displaced so that it does not protrude into the conveyance track between the first holding mechanism and the second holding mechanism. Especially preferably, the first holding mechanism is reset into the clamping arrangement, especially the clamping drum.

The first holding mechanism is preferably constructed such that the band-shaped medium can be transported through the first holding mechanism in an open condition thereof (second loading position). For example the band-shaped medium is transported between two clamping jaws of the holding mechanism. The first and second loading positions are preferably selected such that the band material can be conveyed along the same transport track during the transfer between the first and the second holding mechanism.

The first holding mechanism preferably is displaceable in such a way that the band-shaped medium (in the first loading position) can be transported past the first holding mechanism without being transported through the first holding mechanism, for example without being transported between the clamping jaws. In other words, the first holding mechanism can be displaced in such a way that a transport of the front end of the band-shaped medium, which is located off the input side of the first holding mechanism, is possible without the front end of the band-shaped medium entering the capturing region of the first holding mechanism. Thus, in this so called first loading position of the holding mechanism, the front end of the band-shaped medium can be transported from the clamping arrangement, especially from the track end of the clamping arrangement, to the second holding mechanism without interference by the first holding mechanism, for example by the clamping jaws. Interference with the transport results especially in kinking or deflection of the band-shaped medium during the further transport due to the undesired contact with the first holding mechanism or in an upsetting of the band-shaped medium. The second holding mechanism is preferably also positioned relative to the first holding mechanism so that such interference is impossible.

When the first holding mechanism is in the first loading position for the loading of the clamping arrangement, for example, reset, the controlled transport direction of the band-shaped medium is preferably reversed, just as when the first holding mechanism is opened for the unloading of the clamping arrangement and the band-shaped medium is transported in such a way that it can be captured by the first holding mechanism, i.e. transported, for example, between two clamping jaws.

In a first preferred embodiment, the first loading position corresponds with the clamping position or holding position of the first holding mechanism. For example, when the first holding mechanism is in the clamping position, the band-shaped medium is held by the inner surfaces of the two clamping jaws. If it is in the first loading position, which corresponds with the clamping position, the band-shaped medium is guided along the backside of that clamping jaw which is closer to the transport mechanism.

The open position of the first holding mechanism in which the band-shaped medium can be transported to the first holding mechanism for clamping or in which at the beginning of the unloading the first holding mechanism can release the band-shaped medium, is herein referred to as second loading position. As already mentioned above, the first holding mechanism is preferably moved to the first loading position for the loading during the transfer between the first holding mechanism and the second mechanism so that the second loading position can be freely structured. It is preferably structured in such a way that in the second loading position a transport (in opposite direction) is carried out between the first holding mechanism and the second holding mechanism for the unloading along the same conveying path.

The transport mechanisms and the first holding mechanisms are preferably coupled with one another either mechanically (for example by way of control disks) and/or electrically (for example by way of an electric control and step motors). The coupling is preferably in such a manner that in a first coupled position, the first holding mechanism is in the first loading position and thus allows a free transfer, and the transport mechanism does not contact a band-shaped medium on the clamping track. When the first loading position corresponds with a clamping position of the first holding mechanism, which is preferably the case, a band can be tightened along the clamping track from the first holding mechanism to the beginning of the track in the first coupled position. Since the transport mechanism is not in contact with the clamping track, the tightened band-shaped medium can be freely rotated in the first coupled position, for example to carry out a recording. In the first coupled position, the clamping arrangement can also be moved into that position (second preselected position) in which the band-shaped medium can be transported from the internal medium conveyor to the second holding mechanism. The first coupled position is thereby suited as starting point for both the loading as well as the unloading (after completely recording) whereby the first coupled position already allows a transport for the loading, while at the beginning of the unloading the band-shaped medium is still held in the first coupled position.

In a second coupled position, the first holding mechanism is in the first loading position, which means it does not impede a transfer (for the loading), and the transport roller is in contact with the band-shaped medium guided along the clamping track (especially in the vicinity of the first holding mechanism). In the second holding position, a transfer from the second holding mechanism to the first holding mechanism can thereby be carried out for the loading by way of the transport mechanism, after the clamping arrangement was freely rotated in the first coupled position while the second holding mechanism holds the band-shaped medium in order to load the clamping arrangement.

The second coupled position also provides a further step for the unloading of a band-shaped medium provided with pictures. While the band-shaped medium is still held during the unloading in the first loading position by the first holding mechanism, the transport mechanism is already brought into contact with the band-shaped medium. The band-shaped medium is thereby held on the clamping track even when in the next step the first holding mechanism is released (second loading position).

In a third coupled position, the first holding mechanism is moved into the second loading position, it is thus released, in order to release a clamped band-shaped medium or to receive a band-shaped medium for holding. During loading, the band-shaped medium is supplied to the first holding mechanism in the third coupled position by the transport mechanism (after it has been guided past the first holding mechanism in opposite direction in the first loading position), so that the first holding mechanism can then hold the band-shaped medium by transfer into the first loading position. For example, this is carried out by shifting from the first coupled position into the second coupled position and then into the first coupled position in which finally the recording of the images can be carried out.

The third coupled position also initiates the end of the unloading process. The first holding mechanism in the second loading position releases the held band-shaped medium which can then be transported to the second holding mechanism by way of the transport mechanism. In contrast to the unloading, the transport is thereby not carried out past the first holding mechanism but through the capturing region of the first holding mechanism. When the first holding mechanism is coupled with a (first) cutting device, as discussed above, the band-shaped medium can be severed simply by closing of the first holding mechanism or shifting thereof into the first position, after it has been unloaded. This is carried out preferably by shifting from the third coupled position through the second coupled position into the first coupled position.

In accordance with the invention, the sequence of the first, then the second and finally the third coupled position (and the subsequent reverse sequence) provides for the achievement of an automatic loading process as well as an automatic unloading process, when the control arrangement respectively suitably carries out the transport processes, depending on the coupled positions as described above.

BRIEF DESCRIPTION OF THE DRAWINGS

A preferred embodiment of the invention will be further described in more detail in the follow ay of example only and with reference to the drawings, wherein.

DETAILED DESCRIPTION OF THE PREFERRED EMBODIMENT

Additional advantageous features of the process and apparatus in accordance with the present invention will be apparent from the following which can be combined with one another.

Figure 1:
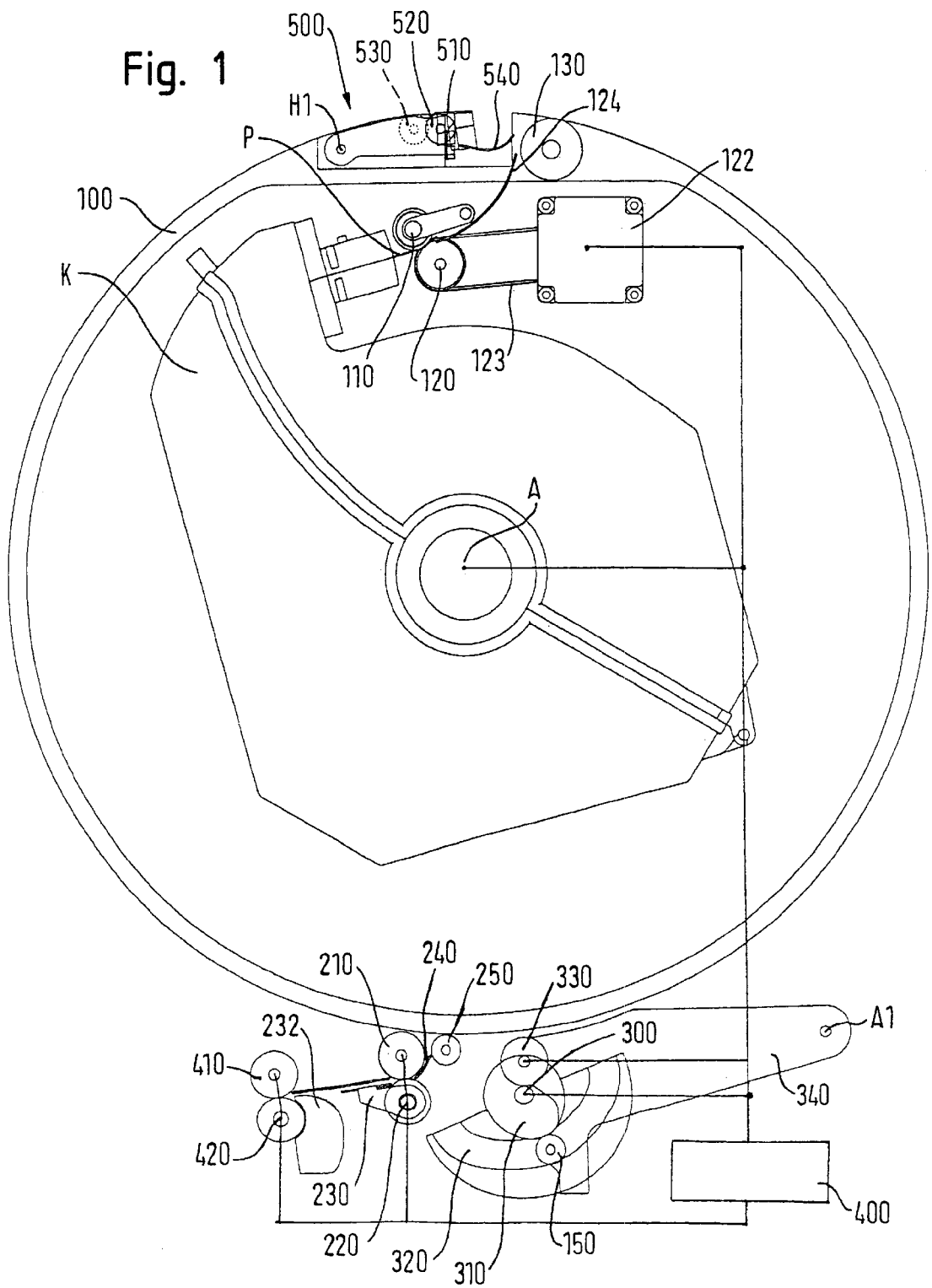
FIG. 1 is a cross section through an embodiment in accordance with the invention before the automatic loading process.
Figure 18:
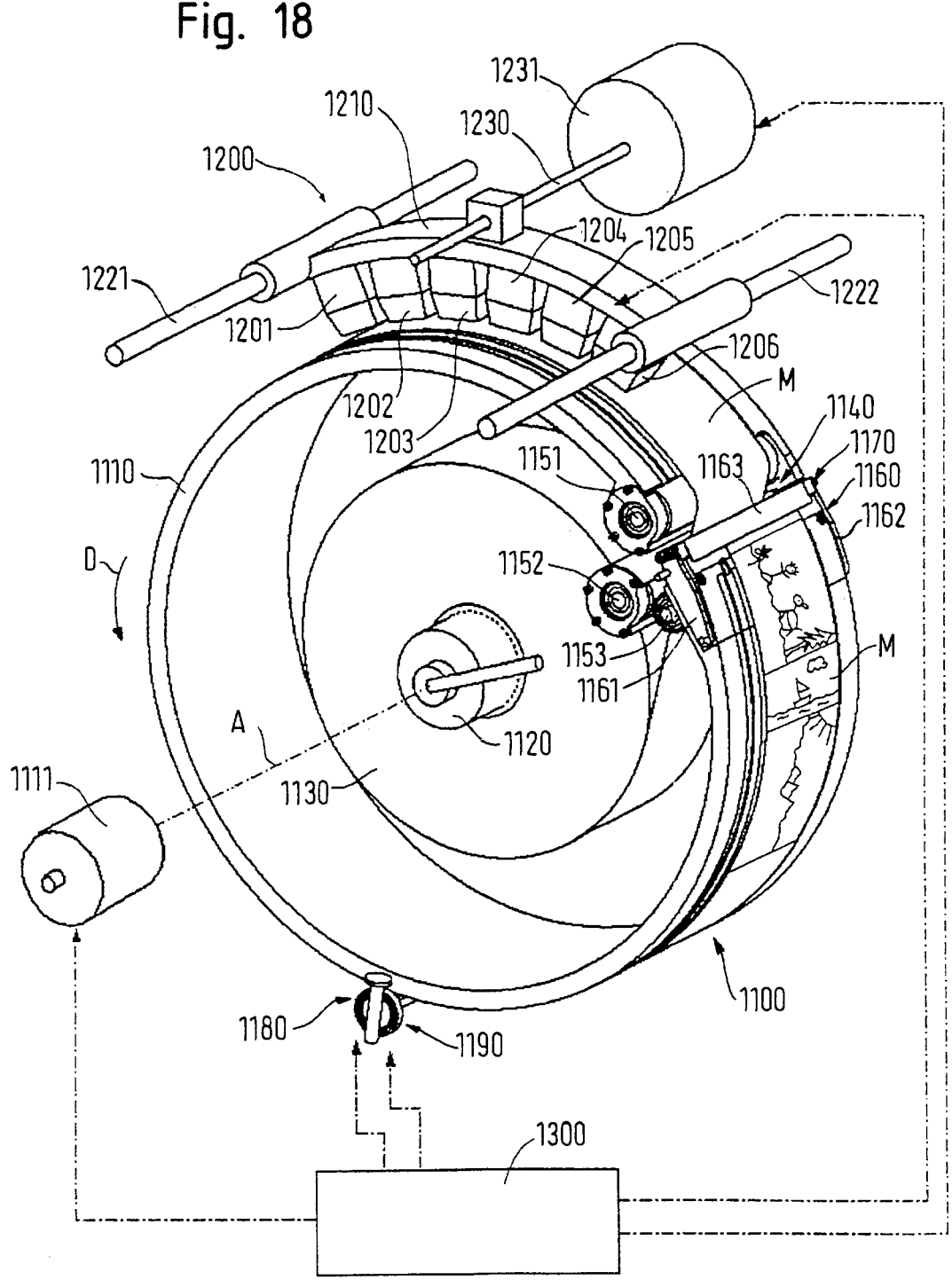
FIG. 18 shows an embodiment according to the prior art.
Figure 19:
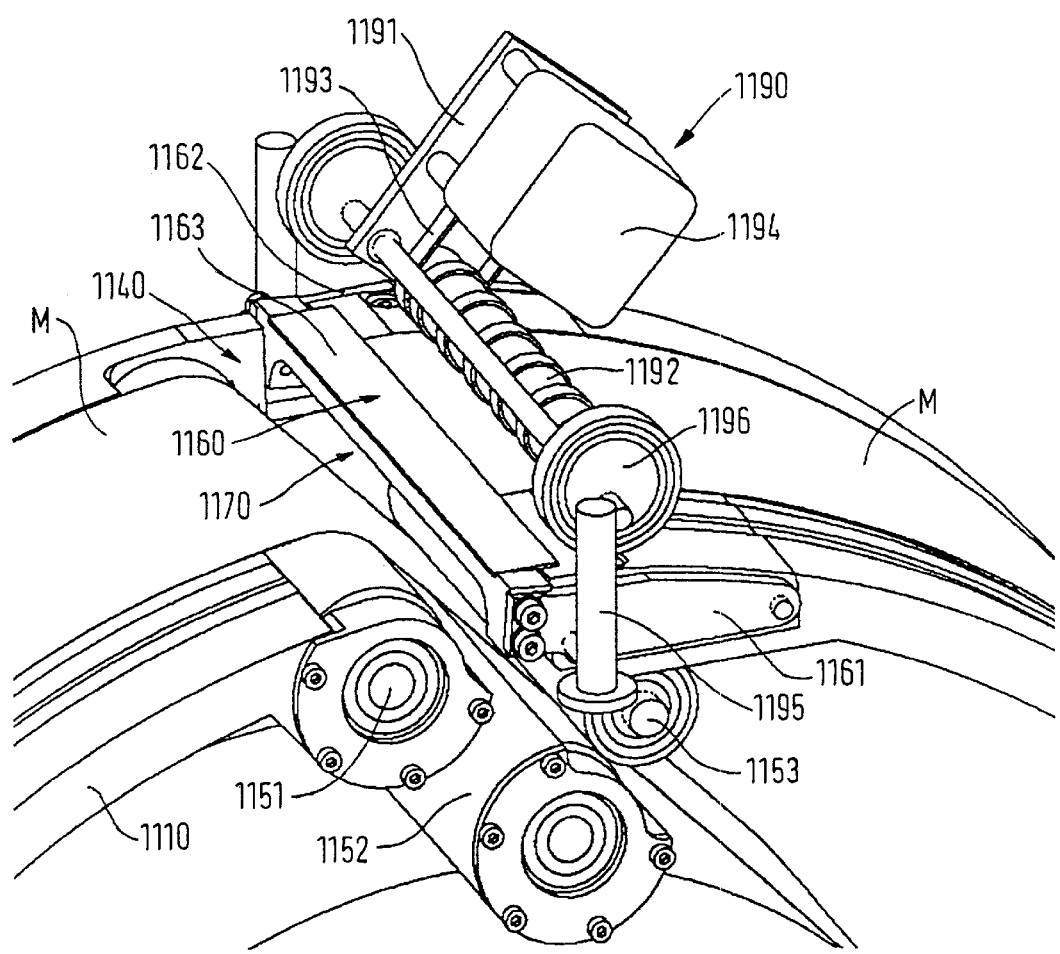
FIG. 19 shows detailed view of the embodiment of FIG. 18 with clamped band-shaped medium.
Figure 20:
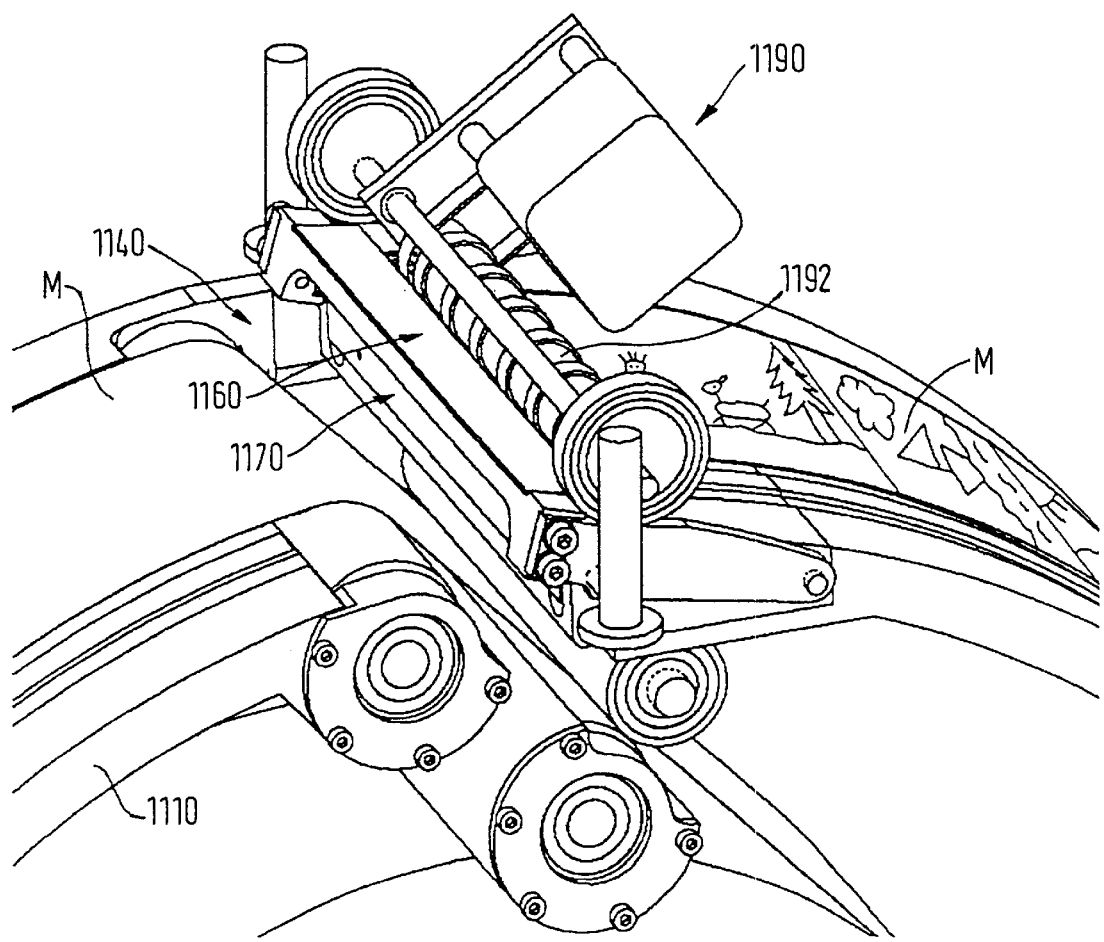
FIG. 20 shows the embodiment of FIG. 18 with the band-shaped medium not clamped.
Figure 21:
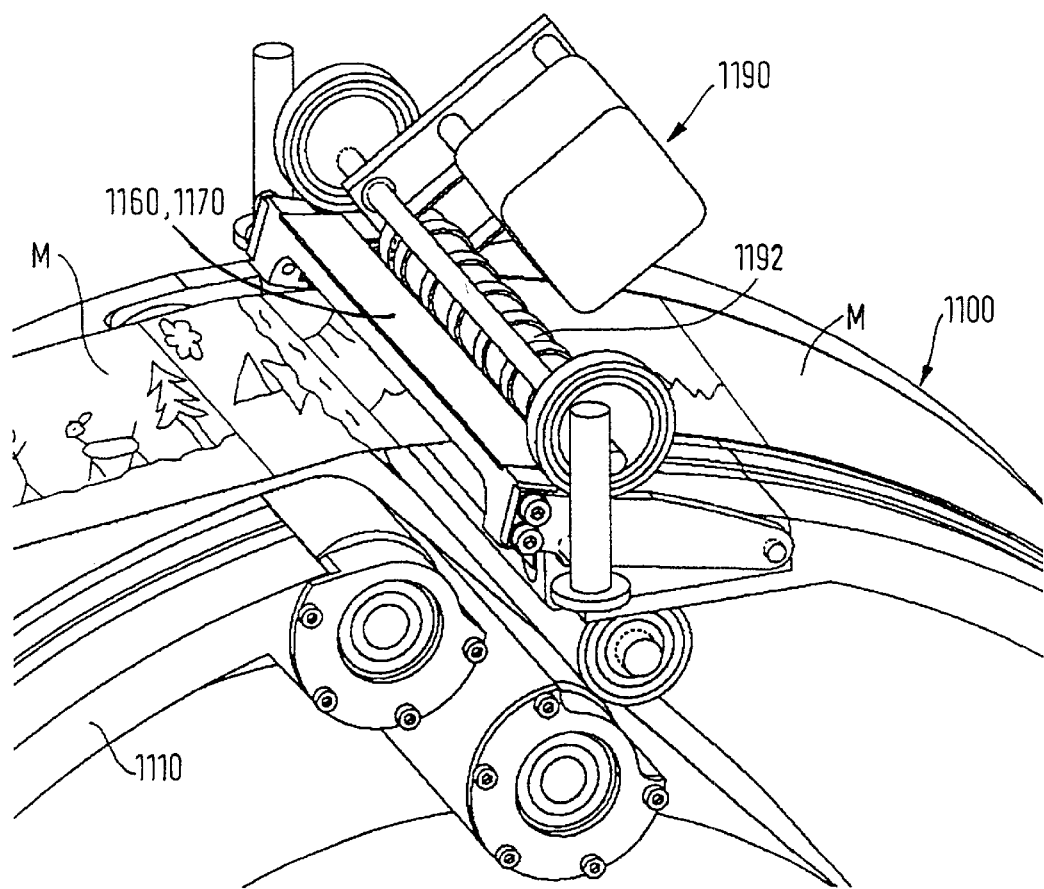
FIG. 21 shows the embodiment of FIG. 18 during the transporting off of the band-shaped medium.
Figure 22:
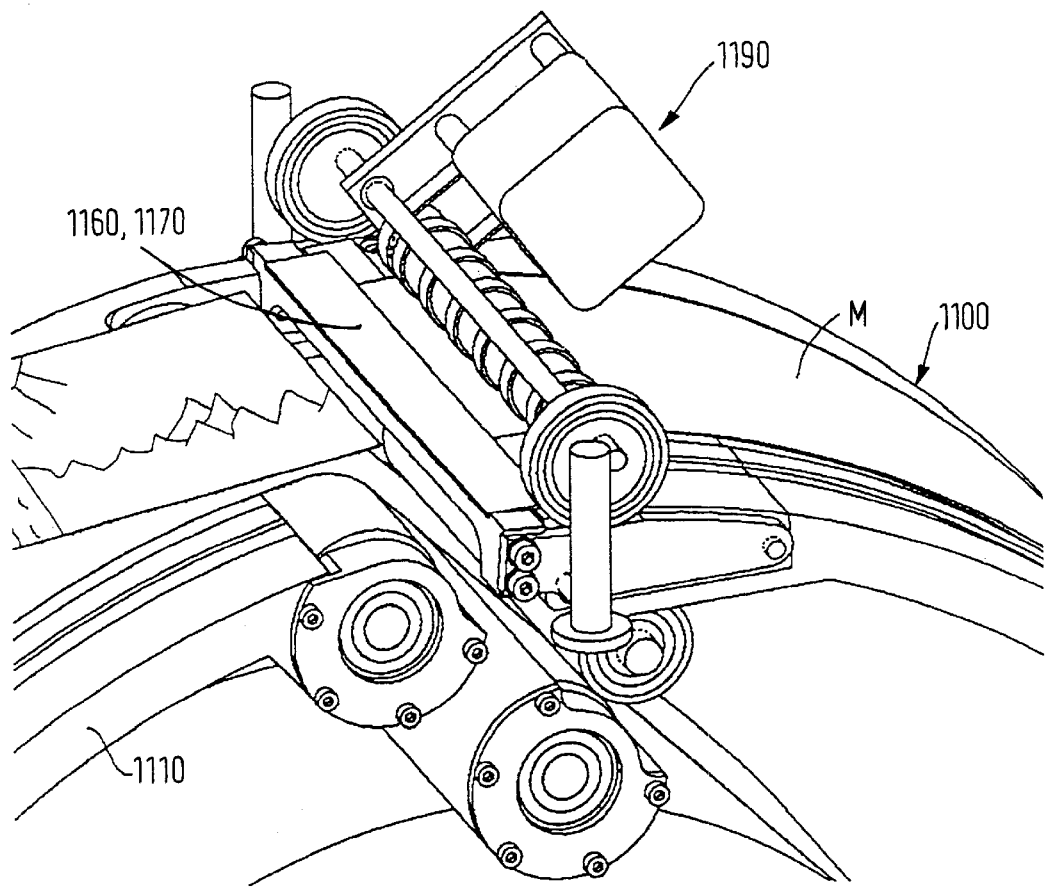
FIG. 22 shows the embodiment of FIG. 18 with severed band-shaped medium.

FIG. 1 is a cross section through a recording device in accordance with the invention. The clamping arrangement is a clamping drum and corresponds to the clamping drum 1110 which was discussed in connection with FIGS. 18–23. A recording apparatus corresponding to the recording apparatus 1200 of FIG. 18 is not illustrated in FIG. 1 for reasons of clarity. The paper roller 1130 shown in FIG. 18 is found within the cassette K of FIG. 1. The paper cassette K and the clamping drum 100 are rotatably supported for rotation about axis A. The axis A is a shaft which can be rotated by a not illustrated electric motor as shown, for example, in FIG. 18 as motor 1111. The drive motor for the shaft A is governed by a control arrangement 400. The clamping drum 100 and the cassette K are connected with the same drive shaft A so that the cassette carrier as well as the clamping drum 100 can be made to rotate by way of the control arrangement 400. The rotational movement of the cassette K and the clamping drum 100 is preferably coupled such that the relative position of the paper output of the cassette at the beginning of the clamping track in the vicinity of roller 130 does not change. In FIG. 1, the drum slit (the track opening) is found to the left of roller 130. The medium roller contained in cassette K gives off the medium, especially a paper P at the exit or output of the cassette K to two internal conveying rollers 110 and 120 which form the internal medium conveyor together with the electric motor 122 and the guide 124. The roller 110 is a follower roller and the roller 120 is driven by the electric motor 122 through a belt 123. The electric motor 122 is also governed by the control 400.

The position shown in FIG. 1 is the starting condition for the automatic loading of the clamping drum 100 with the medium P according to the present invention. The medium P is therefor automatically or manually fed between the rollers 110 and 120 and held between these rollers. For example, a roller 110 is biased against the roller 120 by a not illustrated spring. The guide 124 extends from the output region of the two rollers 110 and 120, especially staring at the roller 120, into the vicinity of a freely rotating roller 130 which is found at the beginning of the clamping track and provides for a continuous transition to the circular transport track in that it is suitably reset into the clamping drum. The clamping track extends from the free wheeling roller 130 to the first holding mechanism 500 and more exactly to the blade 510 which forms part of the holding mechanism 500.

In the position illustrated in FIG. 1, the first holding mechanism 500 is in the first loading position. In this first loading position, the holding mechanism 500 is preferably pivoted about the axis H in such a way that it does not extend or not substantially extend beyond the circular circumference of the clamping drum 100. In other words, it is preferably reset into the clamping track. A roller 520 makes it possible to capture the first holding mechanism 500 in such a way that it can be pivoted away from the drum about the axis H. This will be described later in more detail. The first holding mechanism 500 is held in the first holding position shown in FIG. 1 by a not illustrated spring.

The roller 530 is preferably reset into the clamping drum 100 just like the roller 520. The roller 530 preferably extends to the circular surface of the clamping track and supports the transfer of the band-shaped medium along the clamping track as will be described later.

The holding mechanism further includes a guide 540. The latter with its side directed towards the interior of the clamping drum cooperates with the guide 24 in order to guide the band-shaped medium to the second holding mechanism and also to the beginning of the clamping track as will be described later. The control arrangement 400 is also connected with the transport roller 330 which cooperates with the follower roller 530 in order to drive the band-shaped medium as will be described later. The control arrangement 400 drives a shaft on which the transport roller 330 is supported.

The control 400 is also connected with a camshaft 300 which together with a small cam disk 310, a guide ball bearing 150 and a large cam disk 320 operates to bring the first holding mechanism 500 and the transport mechanism 330 in the first, second and third coupled positions. This will be explained in more detail later.

The guide ball bearing 150 and the transport roller 330 are mounted on a plate 340 which is pivotable about the axis A1. The camshaft 300 which is rigidly connected with the small cam disk 310 and the large cam disk 320, is stationary. In the condition illustrated in FIG. 1, the small cam disk 310 rests with the peak of its egg-shaped body against the guide ball bearing 150. The plate 340 and also the transport roller 330 are thereby pivoted away from the clamping drum 100 against the biasing force of a not illustrated spring and the transport roller 330 is not in contact with the clamping drum 100. The guide ball bearing 150 as well as the transport roller 330 are connected with the plate 340 and pivot therewith.

The rollers 210 and 220 form the second holding mechanism. The roller 210 is driven by way of a shaft under the governance of the control arrangement 400. The roller 220 is a follower roller. The follower roller 250 cooperates with a guide 240 to guide the band-shaped medium to between the two rollers 210 and 220 or away therefrom.

In the band-shaped medium output direction downstream of the rollers 210 and 220, i.e. in FIG. 1 left of these two rollers, two further rollers 410 and 420 are positioned for the further transport of a band-shaped medium provided with pictures. The roller 420 is a follower roller and the roller 410 is driven by way of a shaft by the control arrangement 400.

The pivotable guide portion 230 cooperates with a guide portion 232 to guide the band-shaped medium between the rollers 210, 220 and the rollers 410, 420. The pivoting of the pivotable guide portion 230 is also initiated by the control arrangement 400. This will be described in more detail later. The guide portion 230 is preferably indirectly driven by way of a friction coupling and is optional.

Figure 2:
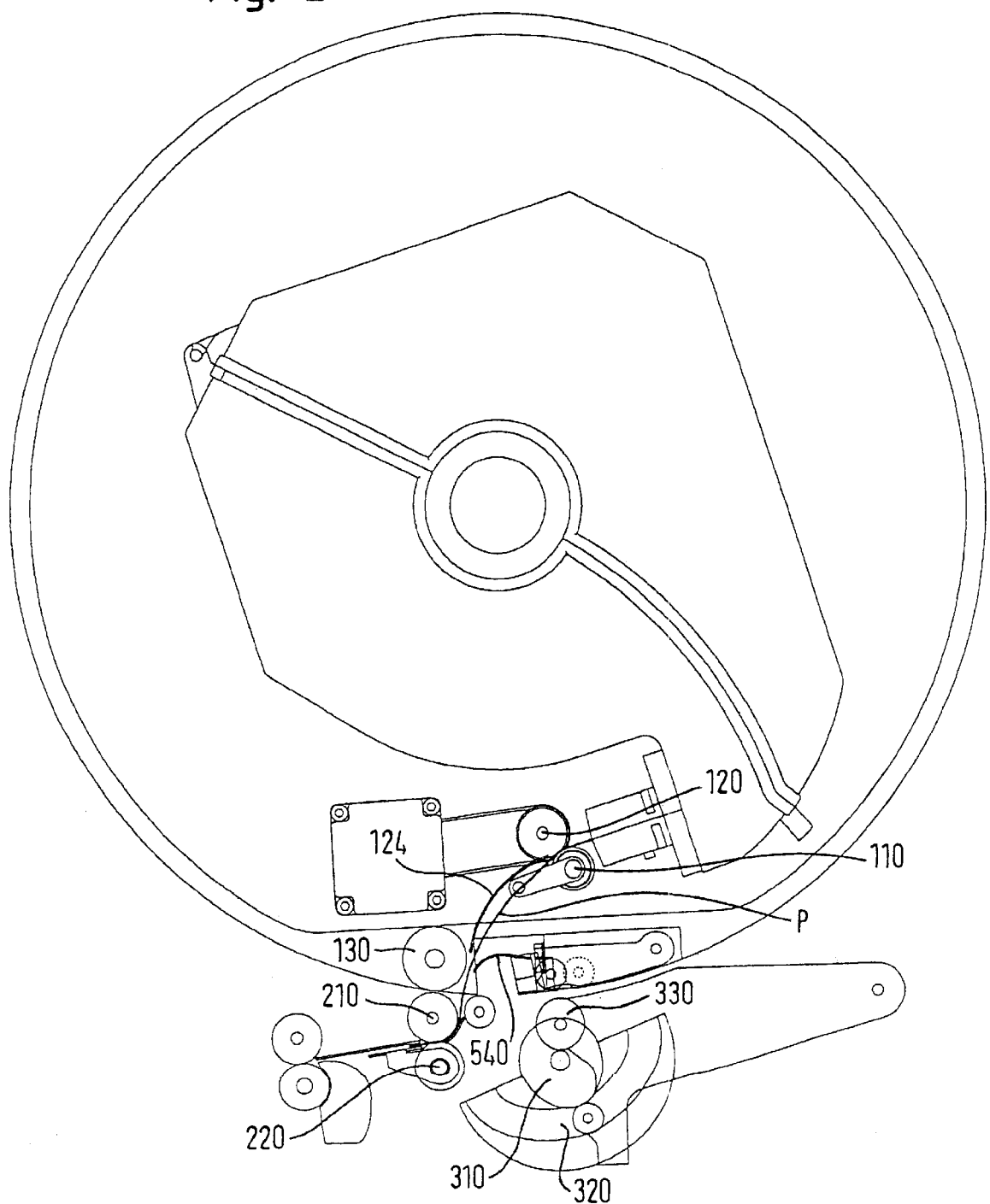
FIG. 2 shows the embodiment of FIG. 1 at the beginning of the loading process.

FIG. 2 shows the clamping roller in a preselected position (second preselected position) wherein the band-shaped medium was conveyed by way of the internal medium conveyor 110, 120 between the guides 124 and 540 past the roller 130 over the guide channel 240 to the rollers 210 and 220 for the holding of the band-shaped medium. The illustrated preselected position does not fully correspond with the above-mentioned first preselected position (see for example 4) in the described exemplary embodiment. For example, compared to the second preselected position the drum is rotated by a few degrees further in clockwise direction in the first preselected position, whereby the space in between the first and second holding mechanisms is smaller in the first preselected position. As in FIG. 1, the cam disks 310 and 320 are in such a position that no contact exists between the transport roller 330 and the surface of the clamping roller 100. The result is no contact with the first holding mechanism.

Figure 3:
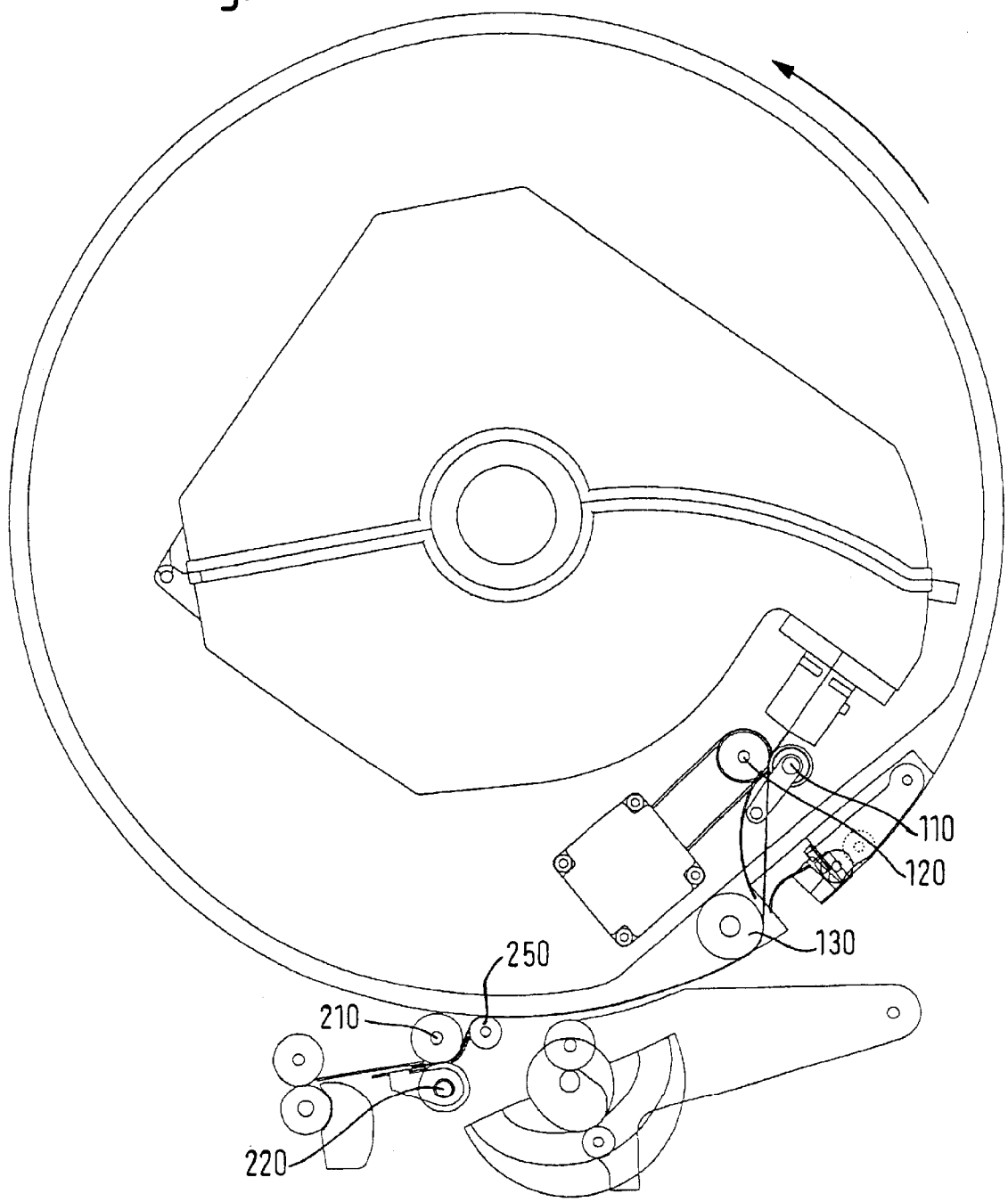
FIG. 3 shows the embodiment of FIG. 2 during the loading of the clamping drum.
Figure 4:
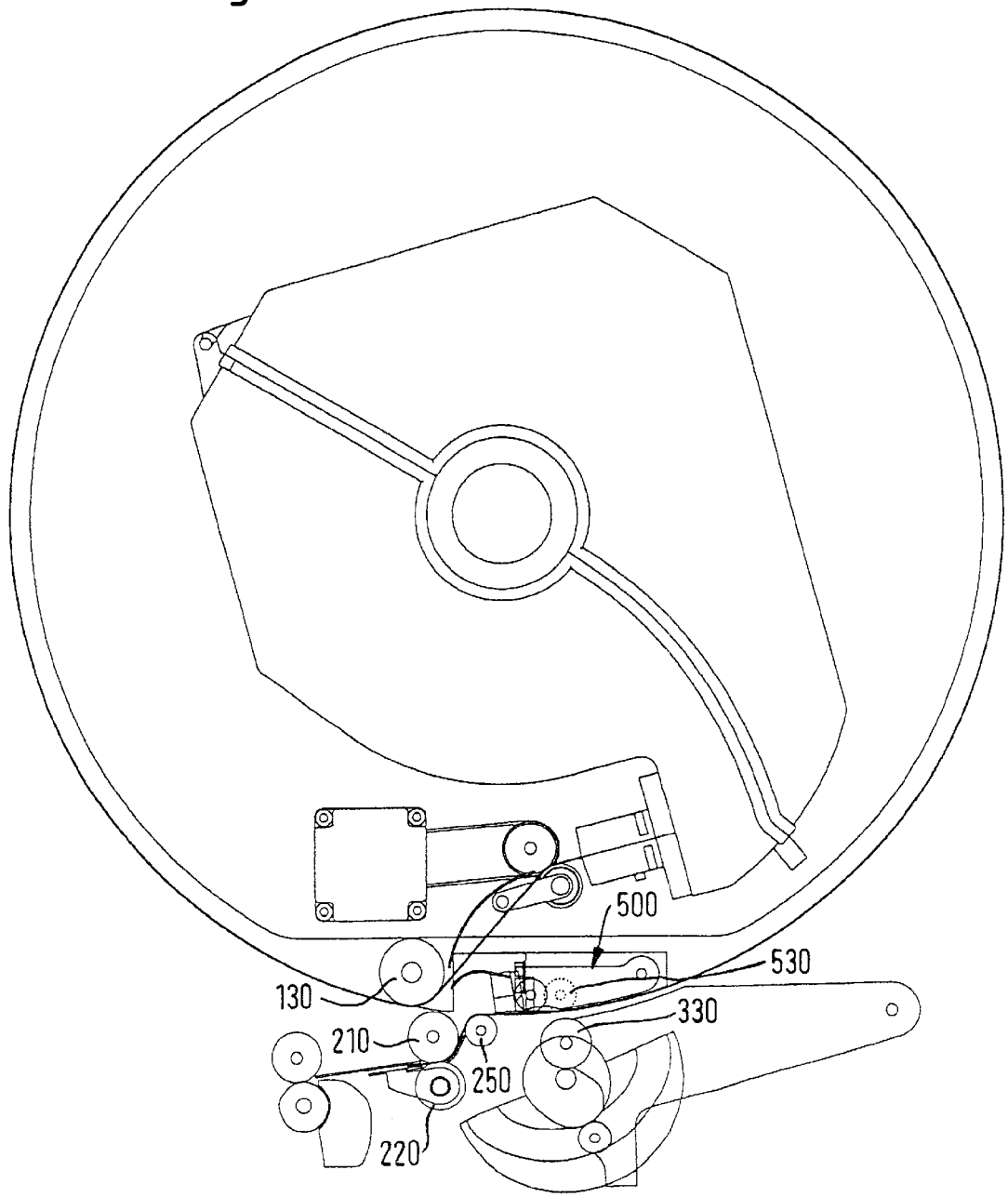
FIG. 4 shows the embodiment of FIG. 3 at the end of the loading of the clamping drum and prior to the transfer.

The first coupled position is also shown in FIG. 4 whereby between FIG. 2 and FIG. 4 a rotation of the clamping drum around its own axis has been carried out as indicated in FIG. 3. By this rotation the band-shaped medium is guided along the surface of the clamping drum 100, since the band-shaped medium is held by the rollers 210 and 220. In the condition illustrated in FIG. 3, the band-shaped medium is guided only along a small portion of the surface namely from the roller 130 to the roller 250. In FIG. 4, the band-shaped medium is also guided from the roller 130 to the roller 250. However, because of the further rotation of the clamping drum, the band-shaped medium extends beyond the holding mechanism 500. The clamping drum has carried out, starting from the position in FIG. 2, about a full rotation or even somewhat more than a full rotation. In contrast to the second preselected position illustrated in FIG. 2, the transport roller 340 now lies in a different position relative to the follower roller 530. Furthermore, the guides 530 and 124 are now in a position which is no longer suited or only in a limited way for the guiding of the band-shaped medium to the rollers 210 and 220. They instead guide the band-shaped medium to the roller 130 at the beginning of the clamping track. The position shown in FIG. 4 corresponds to the first coupled position.

Figure 5:
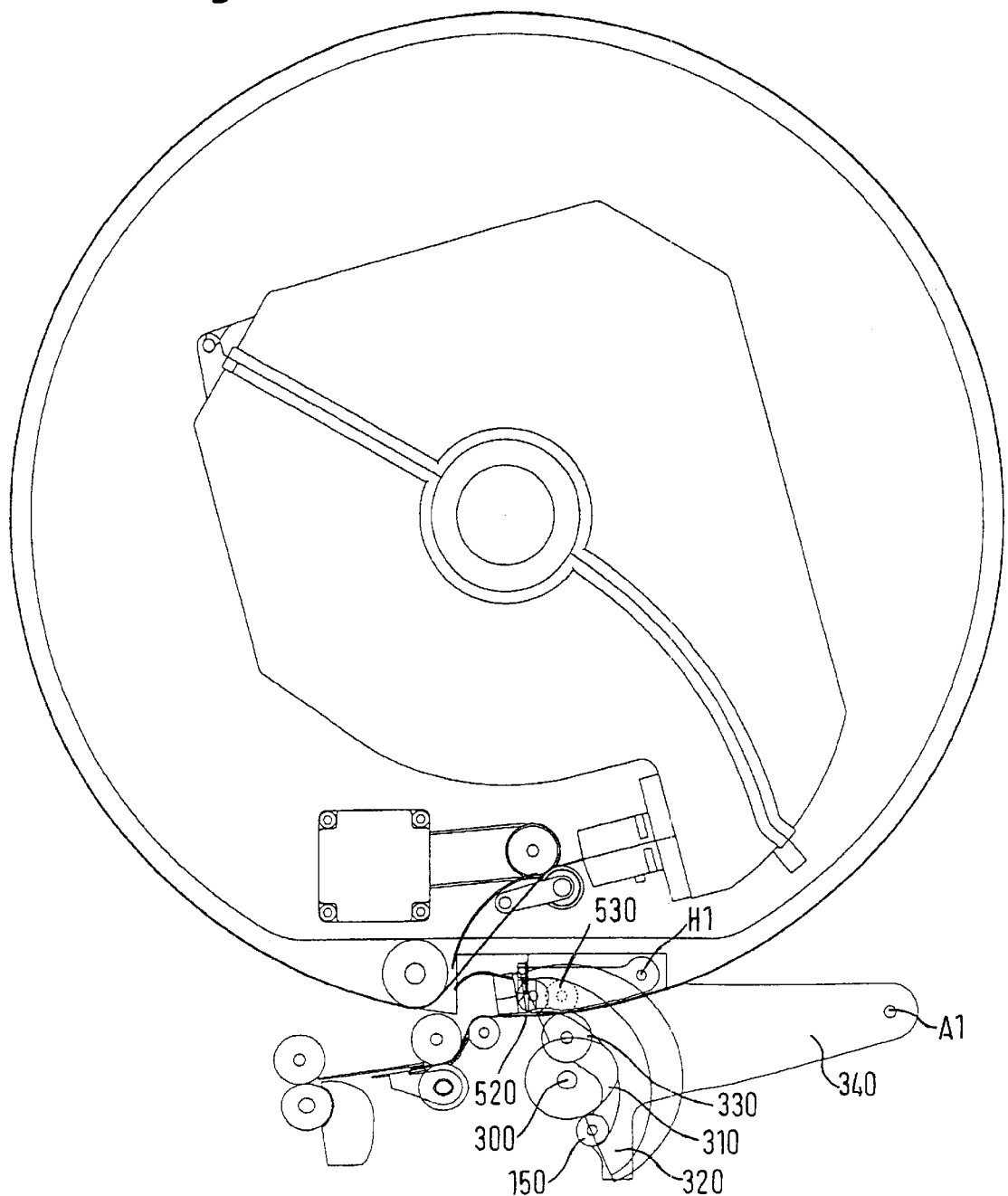
FIG. 5 shows the embodiment of FIG. 4 during the transfer.

In FIG. 5, the cam disks 310 and 320 are rotated counterclockwise about the camshaft 300 by 90° compared to FIG. 4. This results in the above-mentioned second coupled position. The small cam disk 310 is now directed with its smaller side towards the guide ball bearing 150 in such a way that it no longer exerts any force on the guide ball bearing 150. In particular, a gap is created between the cam disk 310 and the guide ball bearing 150. Since no more force is exerted on the guide ball bearing 150 by the cam disk 310, the plate 330 now pivots about the axis A1 towards the clamping drum until the transport roller 330 comes into contact with the band-shaped medium guided on the clamping drum. Thus, the band-shaped medium is positioned between the transport roller 330 and the opposing roller 530 and is clamped by way of these rollers.

In the second coupled position as illustrated in FIG. 5, the cam disk 320 contacts the roller 520 which is rigidly connected with the first holding mechanism, but does not yet cause a pivoting of the first holding mechanism about the axis H1. The clamping drum is in the same rotational position as shown in FIG. 4 so that the band-shaped medium extends over the same distance.

Figure 6:
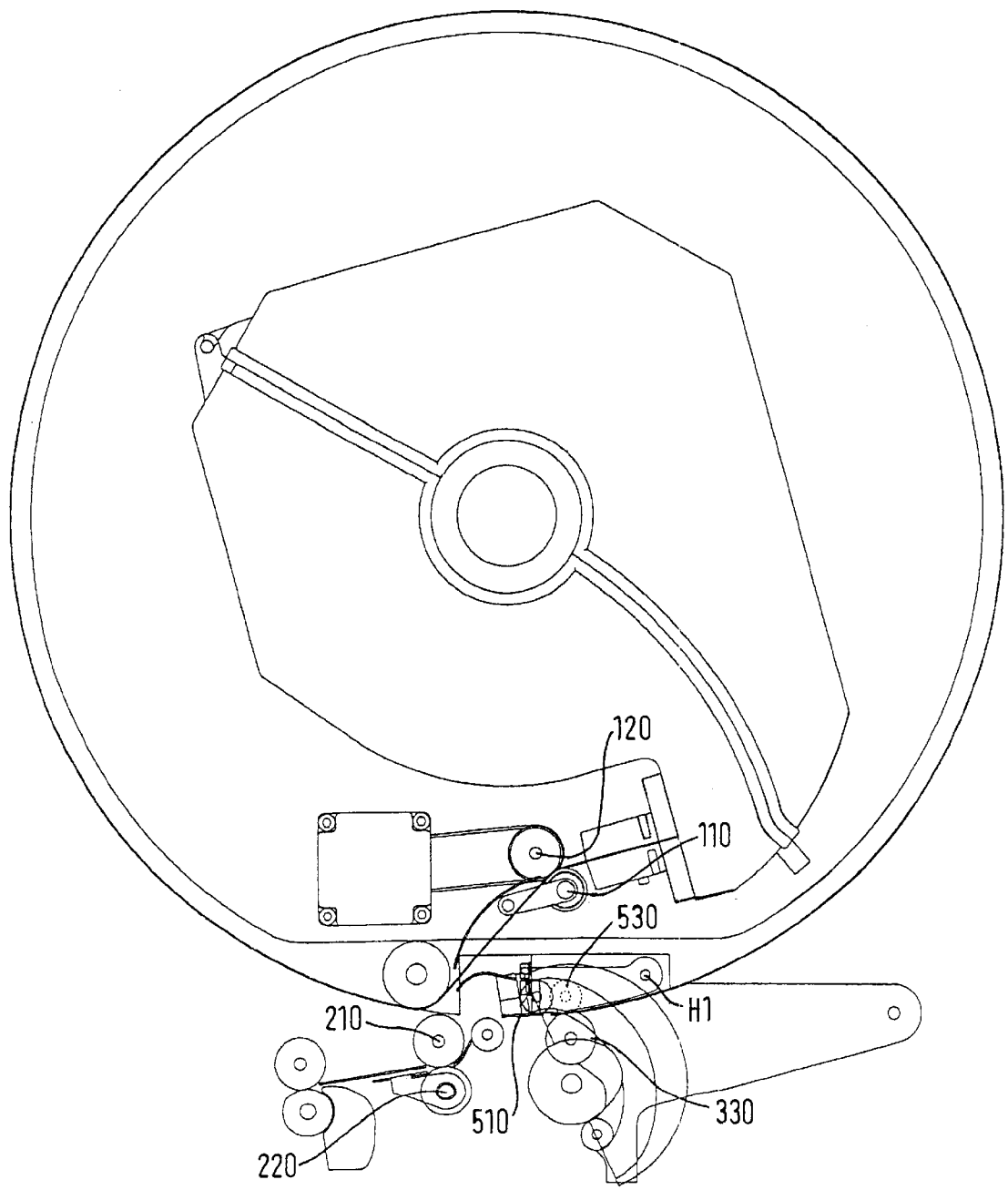
FIG. 6 shows the embodiment of FIG. 5 at completion of the transfer.

FIG. 6 still shows the second coupled position. However, the band-shaped medium was transported in reverse by the rollers 210, 220 until the front end of the band-shaped medium became to be located between the transport roller 330 and the opposing roller 530. In any event, the band was transported far enough in reverse so that it could be supplied to the firs holding mechanism for clamping upon opening of the first holding mechanism. Thus, it was transported past the clamping and cutting part 510 which can be swiveled outwardly about the axis H1.

Figure 7:
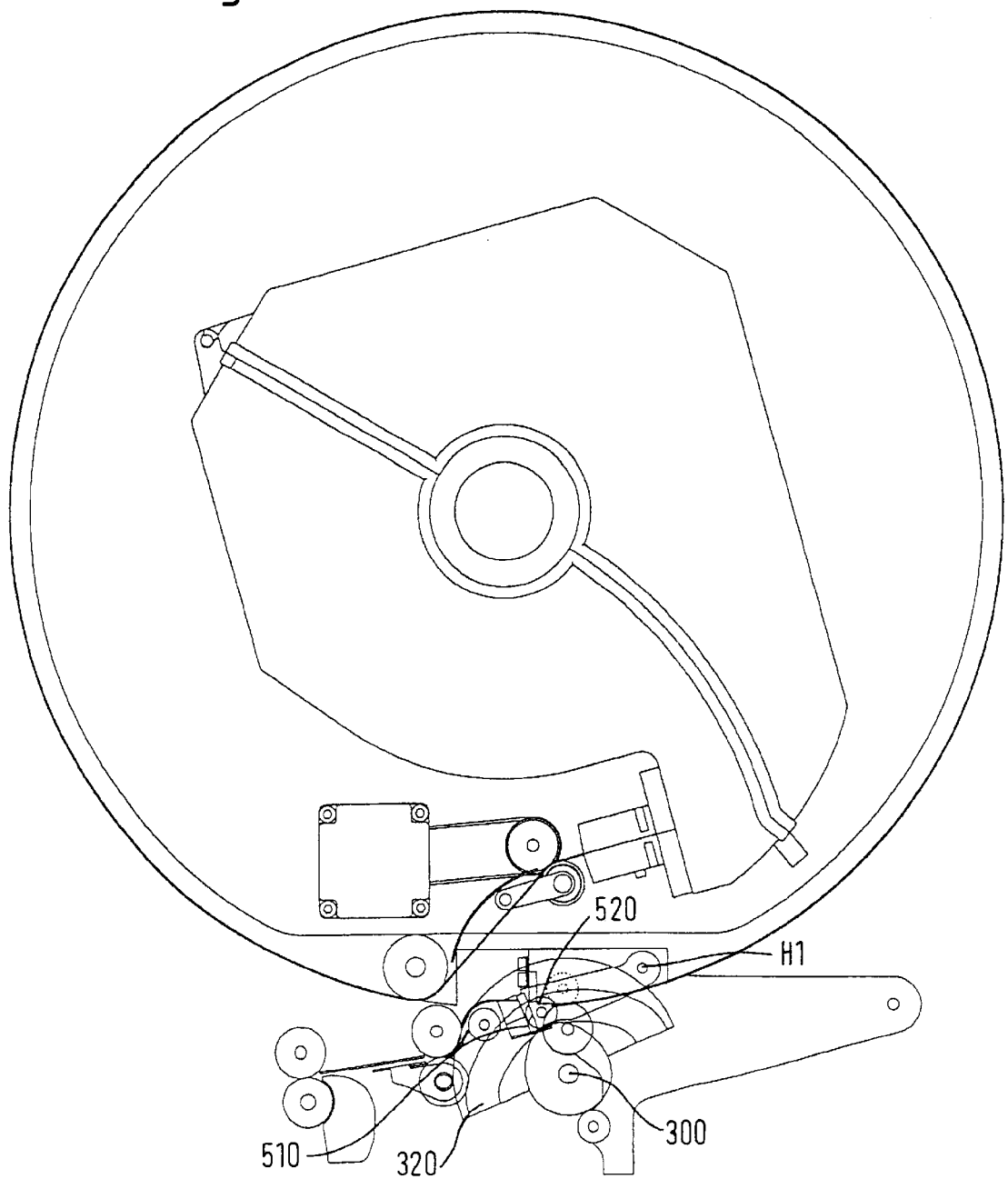
FIG. 7 shows the embodiment of FIG. 6 with opened clamping part.

FIG. 7 shows the third coupled position wherein a force is exerted onto the roller 520 by way of the cam disk 320 in order to swivel the clamping and cutting part 510 about the axis H1 outwardly from the circular clamping surface. This can be freely carried out without relatively influencing the band-shaped medium, since the latter, as already described in connection with FIG. 6, was transported in reverse past the clamping and cutting part. The first holding mechanism shown in FIG. 7 is in its opened position (second loading position) in which the band-shaped medium can be fed thereto for clamping and cutting. The clamping drum is in the same rotational position as in FIGS. 4–6.

Figure 8:
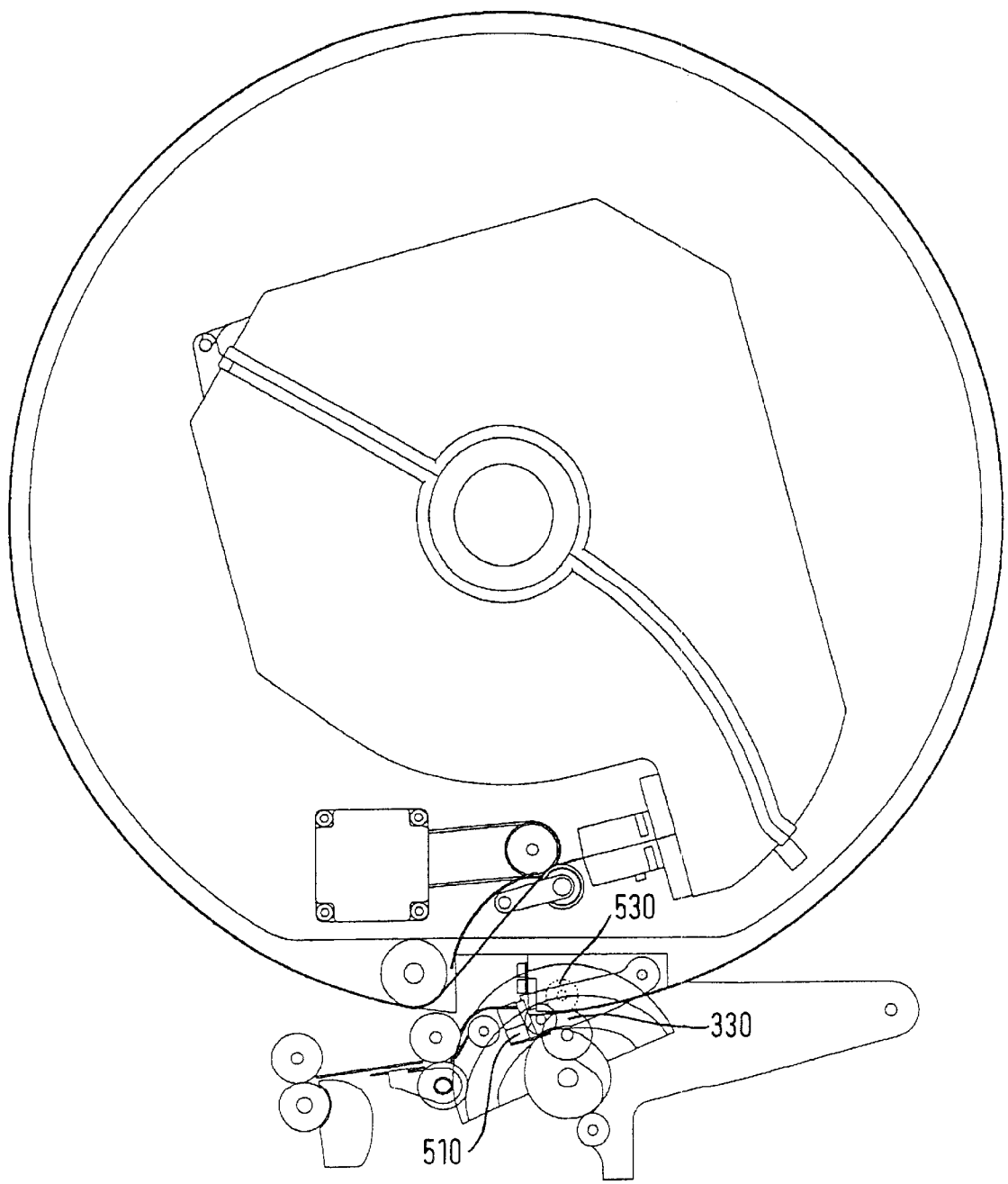
FIG. 8 shows the embodiment of FIG. 7 with the band-shaped medium supplied to the open clamping parts.

In FIG. 8, the clamping drum is still in the same rotational position as in FIGS. 4–7, but the band-shaped medium was already transported in supply direction by way of the transport roller 330 and the opposing roller 530 into the receiving region of the clamping and cutting part 510.

Figure 9:
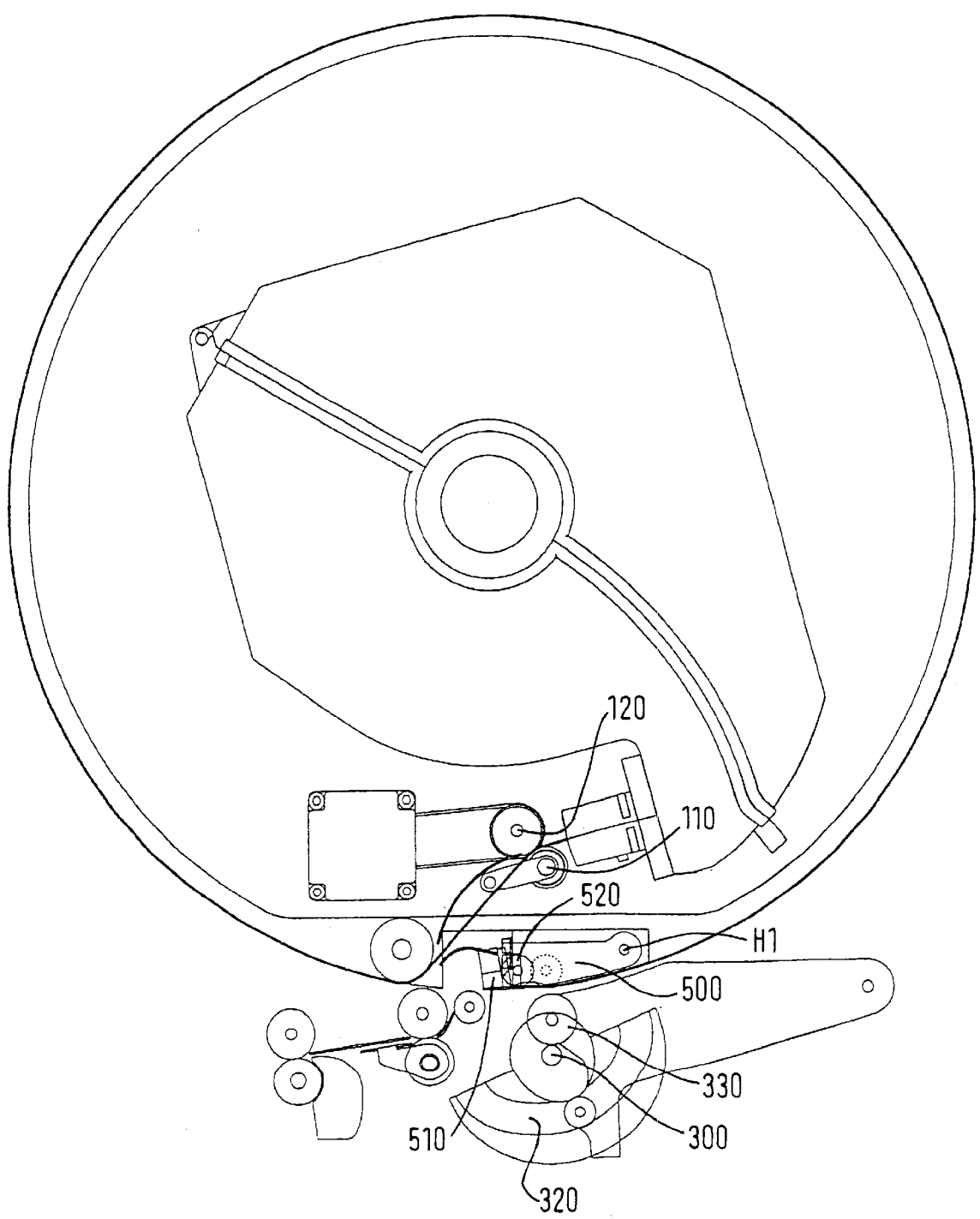
FIG. 9 shows the embodiment of FIG. 8 with clamped band-shaped medium.

In the position illustrated in FIG. 9, the rotational position of the clamping drum is still the same as in FIGS. 4–8. However, the third coupled position is illustrated, wherein the clamping and cutting part 510 are again swiveled about the axis H1 (by action of a not illustrated spring) in direction towards the clamping drum and clamp the front end of the band-shaped medium which is located in the receiving region of the clamping and cutting part. A reverse pivoting about the axis H1 is caused by the not illustrated spring (elastic element) after the roller 520 was released by the large cam disk 320. The small cam disk 310 again forces against the guide ball bearing 150 so that the transport roller 330 is lifted off the band-shaped medium.

Thus, in the position illustrated in FIG. 9, the band-shaped medium can be tightened along the clamping track by reverse transport by way of the rollers 110 and 120. In the position shown in FIG. 9, the band-shaped medium is ready for the recording, and the loading process is completed.

The position illustrated in FIG. 9 is also the starting point for the unloading of a printed band-shaped medium after a number of complete rotations of the clamping drum was carried out for the printing. In other words, after the printing, the clamping drum is again in the position illustrated in FIG. 9. That position is the first coupled position.

The unloading process will now be described in connection with the FIGS. 10–17.

Figure 10:
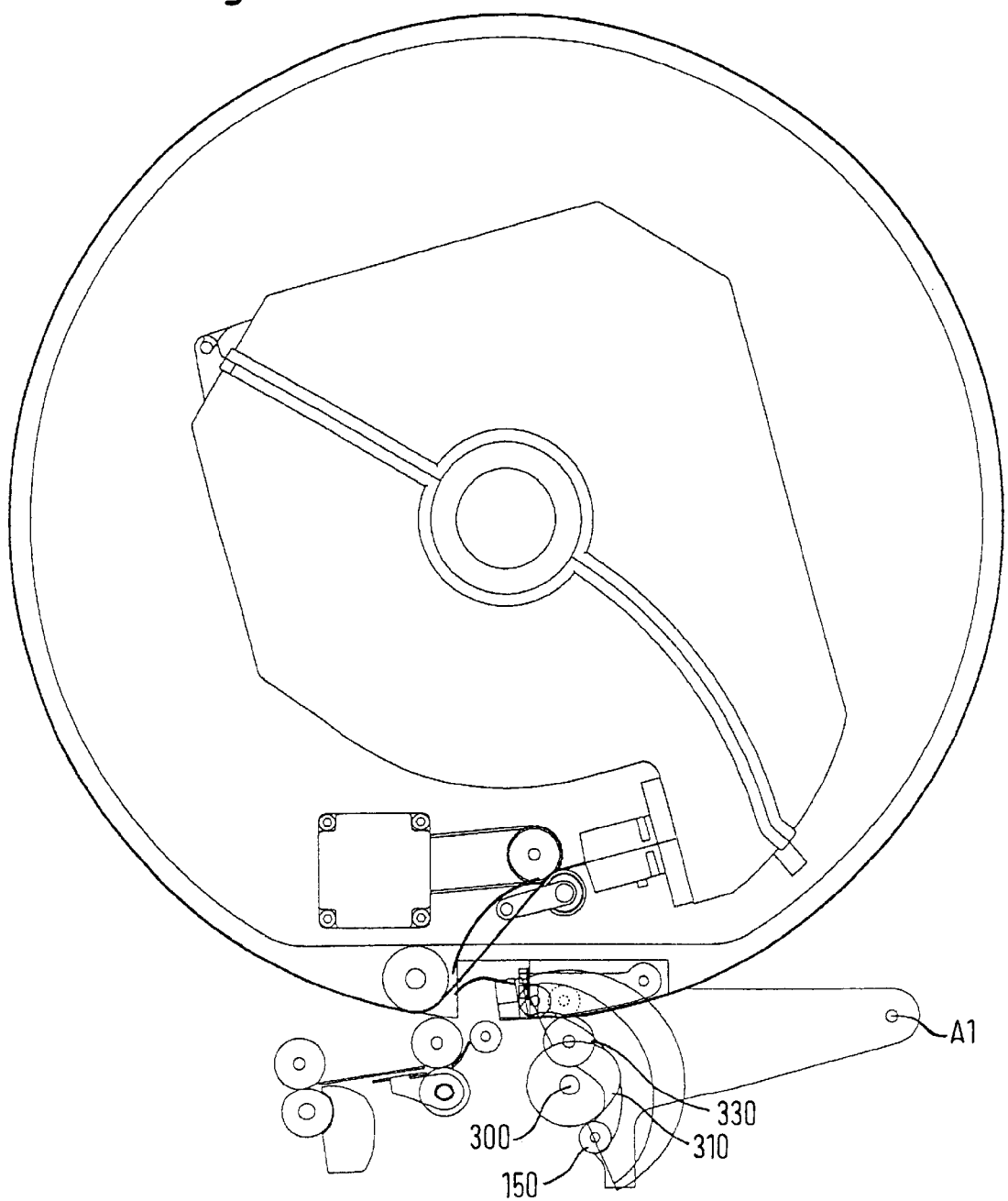
FIG. 10 shows the embodiment of FIG. 9 with the transfer roller in contact with the band-shape medium.
Figure 11:
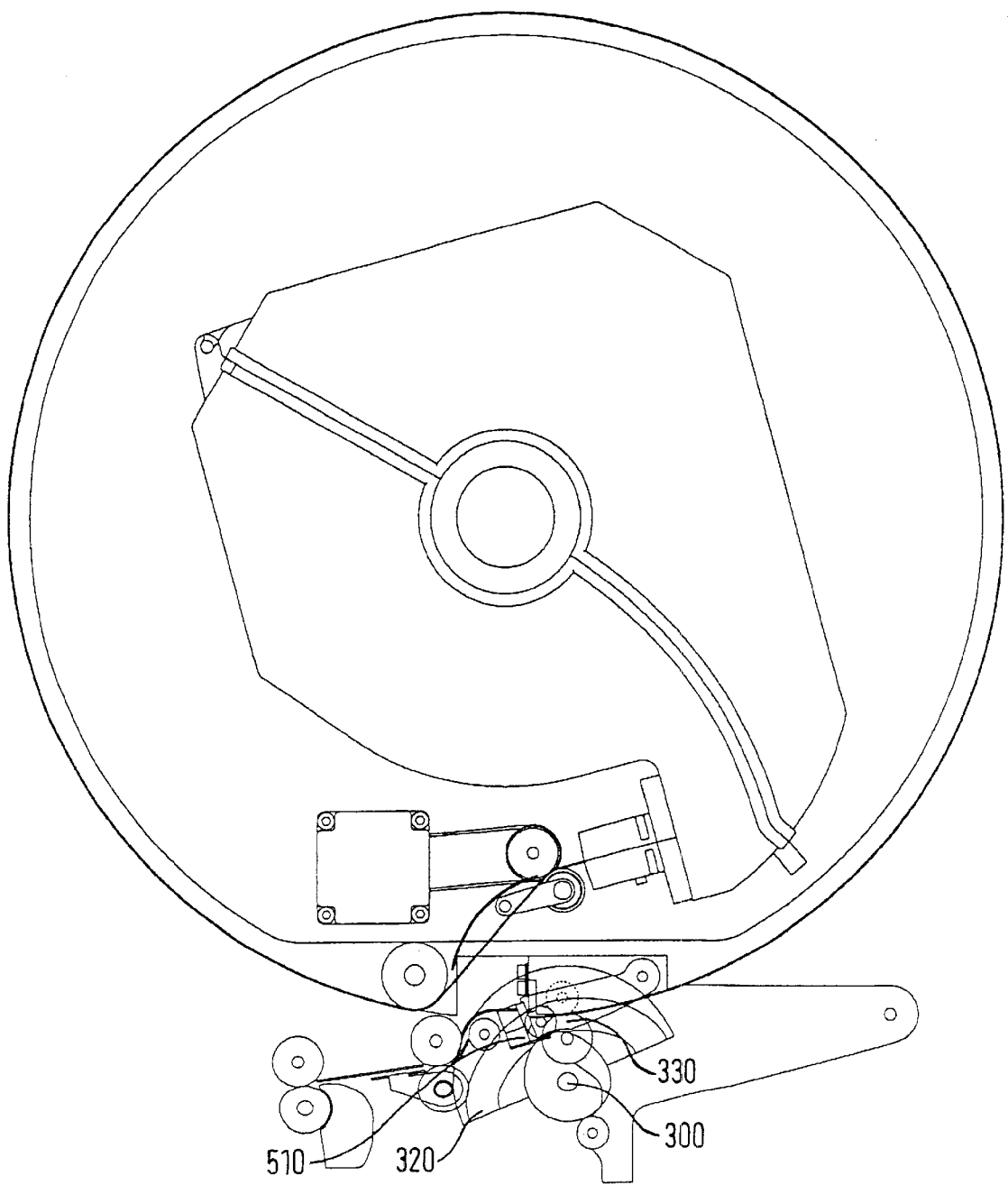
FIG. 11 shows the embodiment of FIG. 10 with opened clamping parts.
Figure 12:
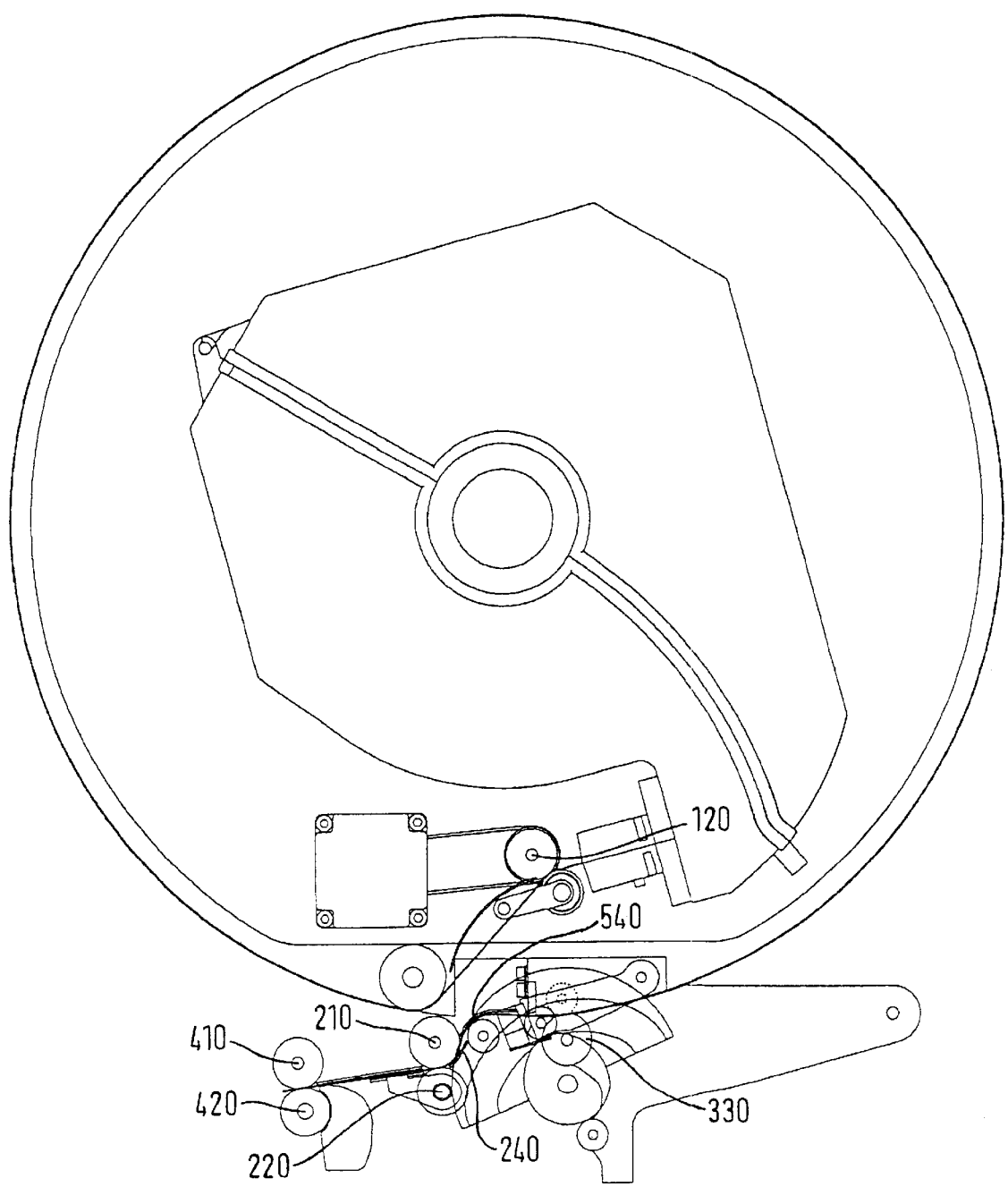
FIG. 12 shows the embodiment of FIG. 11 with a band-shaped medium transported through the clamping part.

As shown in FIG. 10, the transport roller 330 and the first holding mechanism are moved into the second coupled position. Thus, the cam disk 310 is again rotated counter clockwise by 90° so that the transport roller 330 is brought into contact with the band-shaped medium. Thereafter, the third coupled position is achieved by moving the clamping and cutting part 510 into the second loading position so that the band-shaped medium is released for the transport by the transport roller 330.

The band-shaped medium is guided between the clamping and cutting part 510 and the clamping drum 100 by way of the transport roller 330 and then passes over the guides 240 and 540 to the rollers 210 and 220. The guide 540 is connected with the first holding mechanism in such a way that upon the upward tilting of the clamping and cutting part (second loading position) it forms a supporting guide for the band-shaped medium to the rollers 210 and 220, which guide projects in a curved shape from the circular circumference in order to guarantee a continuous transport of the band-shaped medium away from the surface of the clamping drum. Upon recessing of the clamping and cutting part in the first loading position, the guide 540 is also recessed so that it is not in the way during the loading of the band-shaped medium.

The band-shaped medium is transported from the rollers 210 and 220 by rotation of the roller 210, which is initiated by the control 400, to the rollers 410 and 420. The guides 232 and 230 thereby provide for a direct or straight transport to the rollers 410 and 420.

Figure 13:
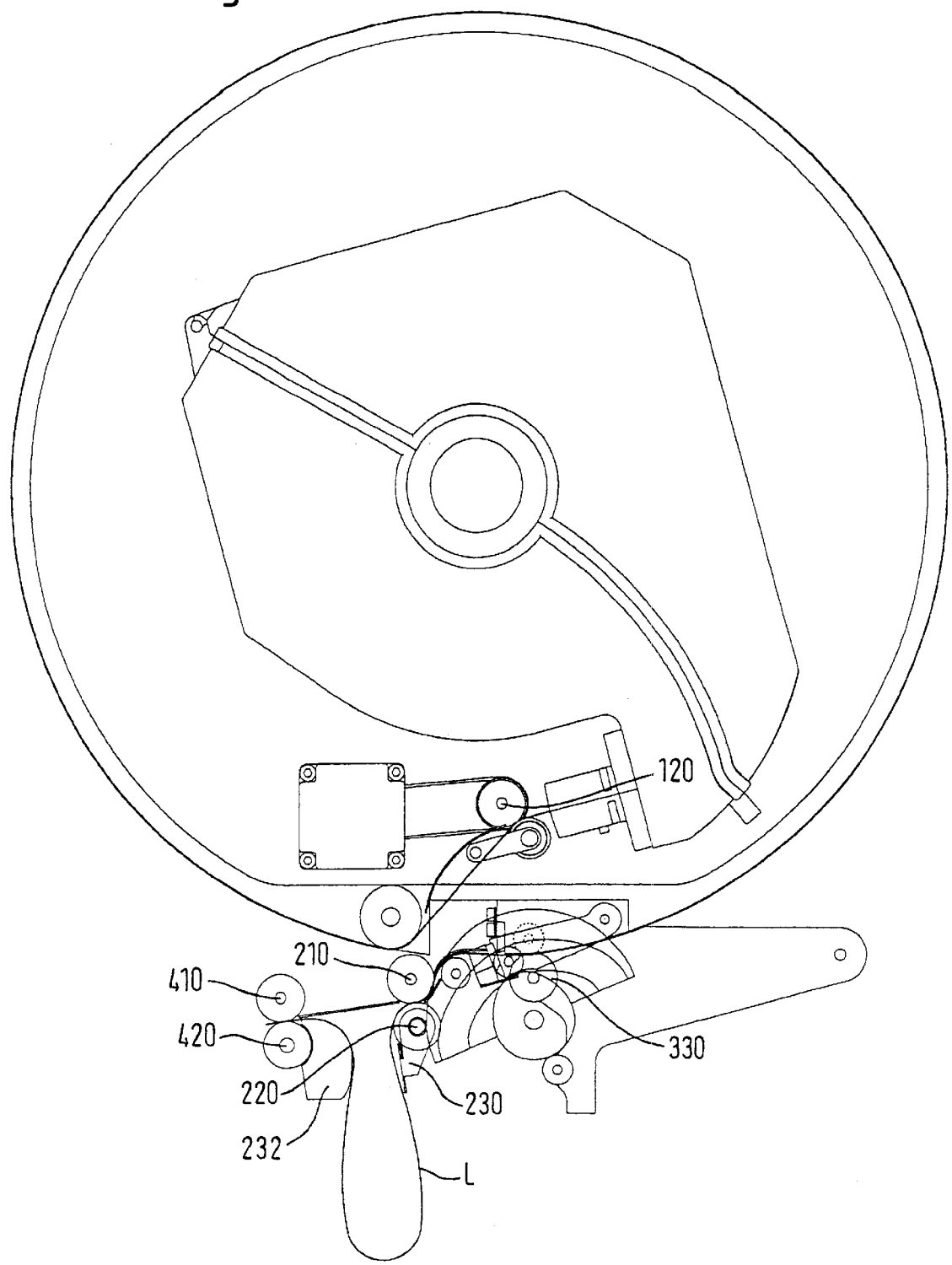
FIG. 13 shows the embodiment of FIG. 12 with a band-shaped medium buffer loop.

As already mentioned above, the guide 230 can be pivoted by operation of the control arrangement, so that the loop L of the band-shaped medium can be formed as shown in FIG. 13, when the front end of the band-shaped medium is held by the rollers 410 and 420, while the band-shaped medium is further transported by the rollers 210 and 220. A formed part 232 positioned opposite the guide part 230 preferably supports the loop formation in that it offers, similar to the pivoted guide part 230, a supporting surface for the loop L, which surface is curved downward in the direction of gravity. While the band-shaped medium is unloaded in the process shown in FIGS. 12 and 13, fresh, not yet printed band-shaped medium is transported back off the internal row 120 in the cassette K and further transported with the help of the transport roller 330 along the surface of the clamping 100 until a part of the band-shaped medium not yet provided with pictures has reached the clamping and cutting part 510.

Figure 14:
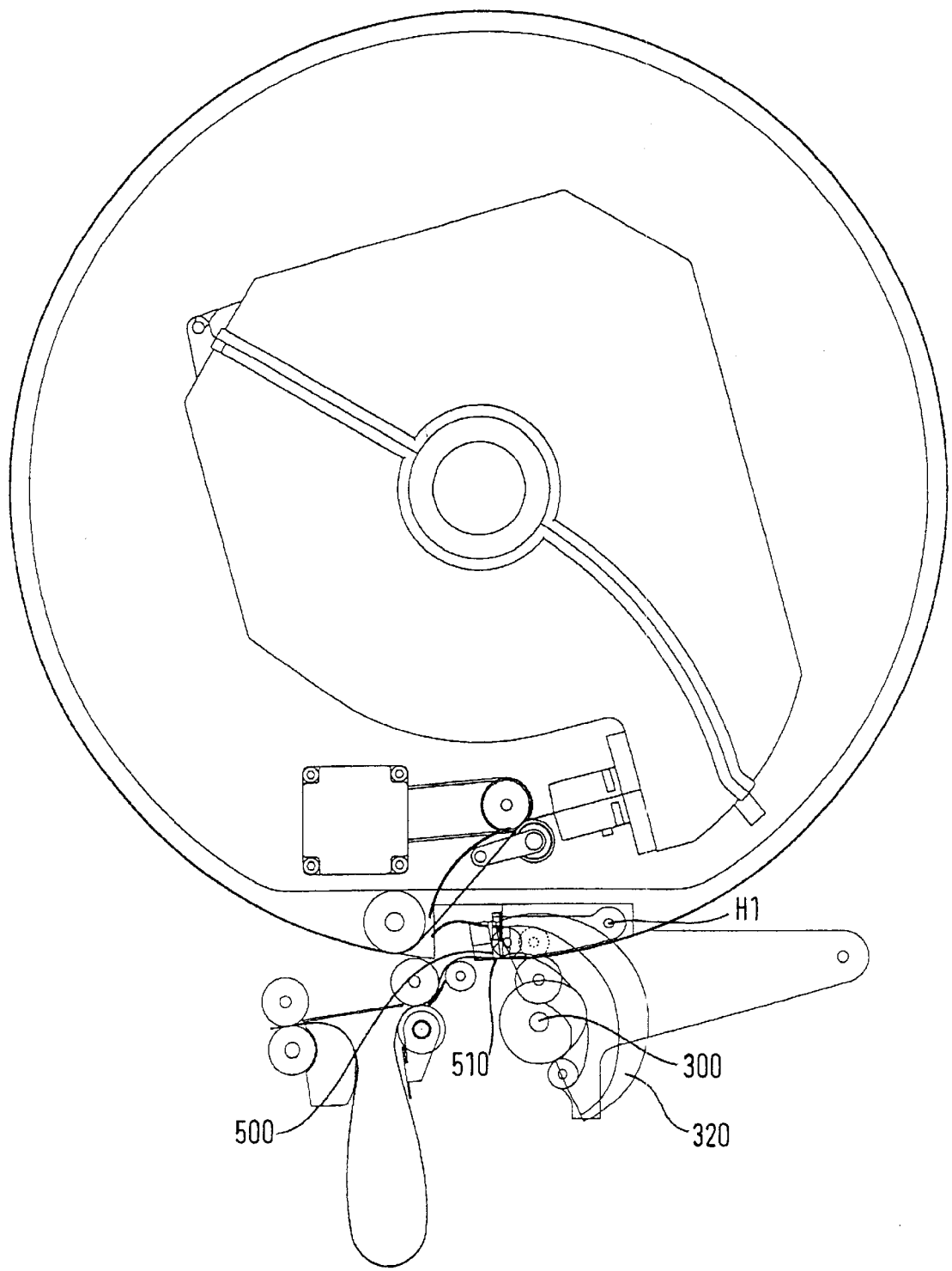
FIG. 14 shows the embodiment of FIG. 13 with severed band-shaped medium.

As shown in FIG. 14, the coupling mechanism is then moved into the second coupled position. The camshaft 300 is therefor rotated clockwise by 90°. The clamping and the cutting part 510 is thereby pivoted by the axis H1 in direction towards the clamping drum. The band-shaped medium is thereby cut and the printed portion of the band-shaped medium severed from the not yet printed portion.

Figure 15:
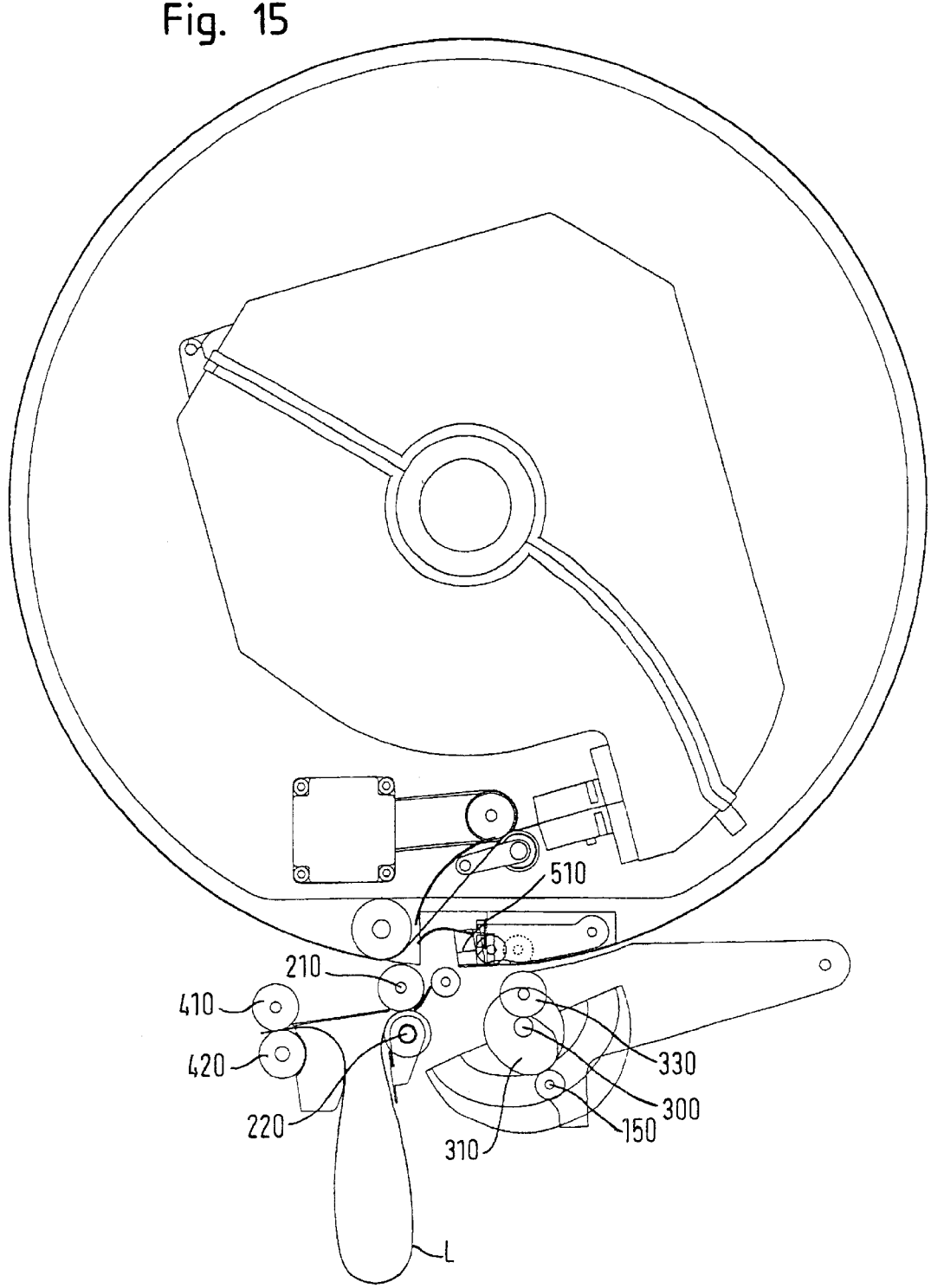
FIG. 15 shows the embodiment of FIG. 14 with lifted off transport roller.
Figure 16:
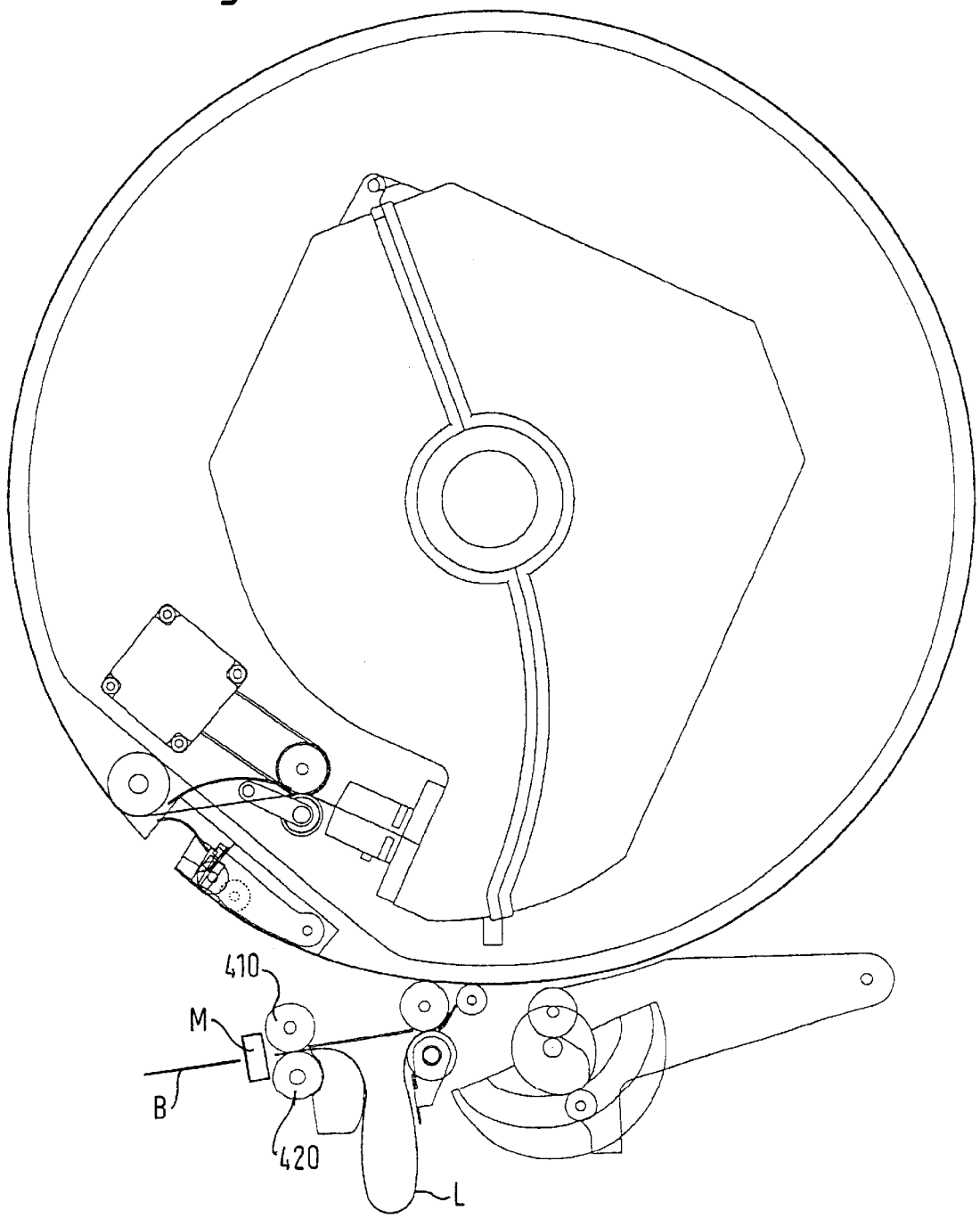
FIG. 16 shows the embodiment of FIG. 15 with a rotated clamping roller and a smaller loop.

In FIG. 15, the transport roller 330 and the clamping and cutting part 510 are again in the first coupled position in which they are not in contact and the clamping and cutting part 510 is pivoted inward so that the clamping drum 100 is freely moveable. The loop L is still formed between the rollers 210, 220 and 410, 420.

In FIG. 13, the clamping drum now leaves the rotational position illustrated in FIGS. 4–15. While the clamping drum is rotated for the recording of new images, the already printed band-shaped medium is further processed in that the loop L is further transported by the rollers 410 and 420 and cut up by the second cutting device M in order to achieve individual recorded pictures B.

Figure 17:
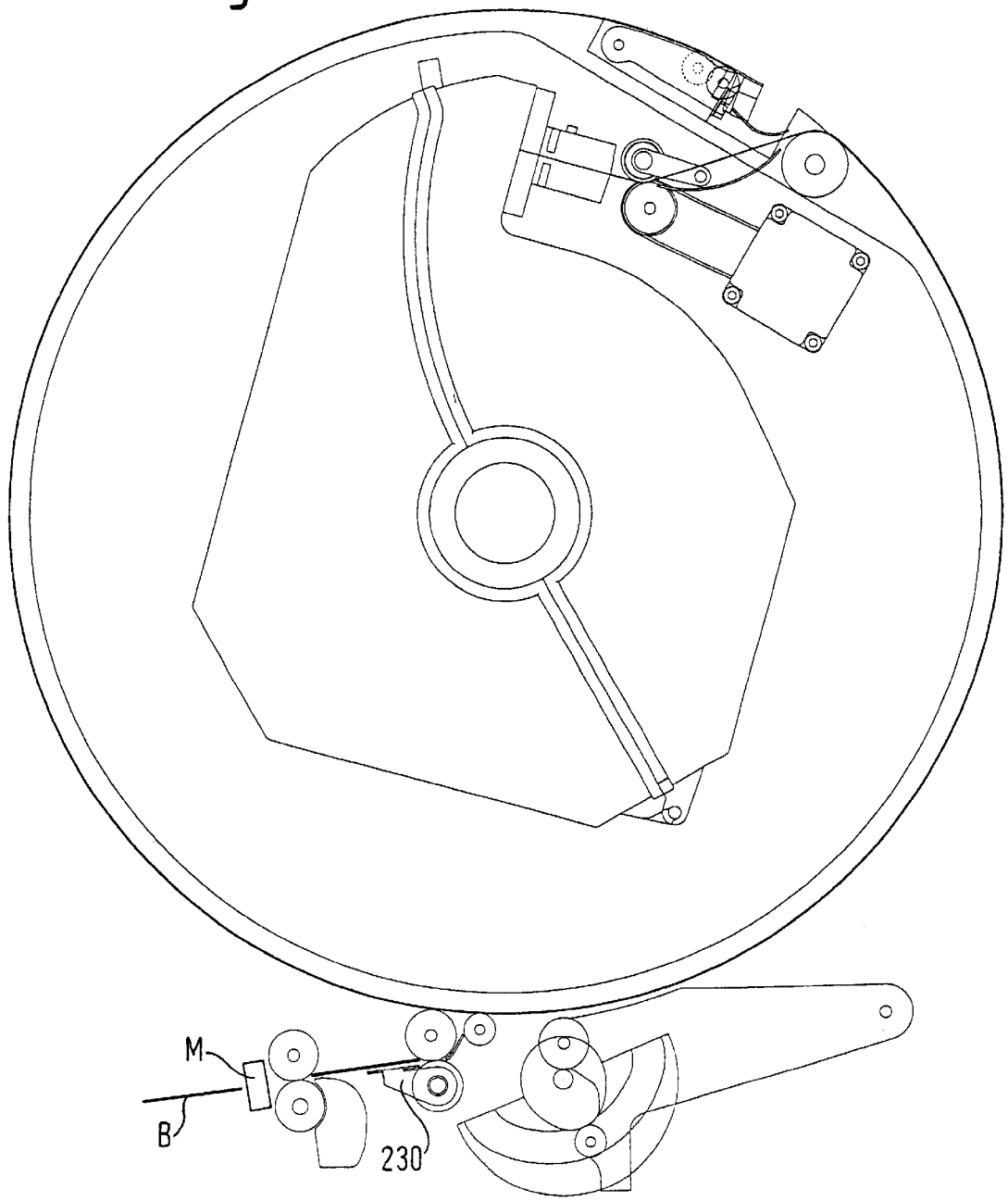
FIG. 17 shows the embodiment of FIG. 16 with worked-off loop, the cutting of the printed medium into the individual images and a clamping drum in rotational position for the next recording process.

After the medium loop L has been completely processed in that the band-shaped medium was transported between the rollers 410 and 420 to the second cutting device M, the guide 230 is again moved back to the original position as is shown in FIG. 17.

A high throughput can be achieved by carrying out in parallel the cutting of the individual pictures and the recording of new images.

What is claimed is:

1. Photographic recording device for the recording of photographic images onto a band shaped medium, comprising:

a medium source for supplying the band-shaped medium;

a clamping arrangement for providing a clamping along which the band-shaped medium can be guided and tightened and at the beginning of which the band-shaped medium is supplied;

a first holding mechanism located at an end of the clamping track for clamping the band-shaped medium supplied from the medium source;

at least one recording apparatus for recording images onto band-shaped medium tightened along the clamping track;

a second holding mechanism for clamping the band-shaped medium, the second holding mechanism being moveable relative to the clamping arrangement;

a transport mechanism for transporting the band-shaped medium between the first and second holding mechanisms, when the first holding mechanism by movement of the clamping arrangement relative to the second holding mechanism was moved into a first preselected position relative to the second holding mechanism; and a control for transferring the band-shaped medium by selectively actuating the two holding mechanisms in order to release the clamped band-shaped medium, and for operating the transport mechanism in the first preselected position for transporting the released band-shaped medium from one of the first and second holding mechanisms to the other.

2. Photographic recording device according to claim 1, wherein the clamping arrangement is constructed to be moveable relative to the transport mechanism and the transport mechanism is selectively engageable with the band-shaped medium guided along the clamping track.

3. Photographic recording device according to claim 2, wherein the relative movement of the clamping arrangement is a rotational movement about a first axis, whereby the transport mechanism and the second holding mechanism are stationary; the clamping track extends about the axis and includes a band-shaped medium output in the form of an opening in the clamping track between the beginning of the track and the end of the track, through which opening the band-shaped medium output by the medium source is conveyed; and the clamping arrangement includes an internal medium conveyor which can transport the band-shaped medium supplied therefor to the second holding mechanism upon positioning of the medium conveyor in a second preselected position relative to the second holding mechanism by rotation of the clamping arrangement.

4. Photographic recording device according to claim 3, wherein the control is constructed for the automatic loading of the band-shaped medium onto the clamping arrangement by actuating the internal medium conveyor for conveying the band-shaped medium in the second preselected position through the band-shaped medium output and to the second holding mechanism; for operating the second holding mechanism for clamping of the band-shaped medium conveyed; for initiating the rotational movement of the clamping arrangement for the guiding of the band-shaped medium along the clamping track and stopping when the first preselected position has been reached; for actuating the second holding mechanism for releasing the clamped band-shaped medium for transfer; for actuating the transport mechanism when the clamping arrangement is in the first preselected position for transport of the released band-shaped medium to the first holding mechanism; and for actuating the first holding mechanism for clamping the transferred band-shaped medium.

5. Photographic recording device according to claim 4, wherein the control is constructed for actuating the internal medium conveyor to convey the band-shaped medium in reverse of the output direction when the transferred band-shaped medium is clamped by the first holding mechanism.

6. Photographic recording device according to claim 5, wherein the first preselected position corresponds at least about with the second preselected position so that the clamping arrangement, to reach the first preselected position from the second preselected position, carries out a full rotation or slightly more than a full rotation for the loading of the clamping track and the band-shaped medium is guided past the first holding mechanism before transfer from the second to the first holding mechanism which is located at the end of the track.

7. Photographic recording device according to claim 1, wherein the first holding mechanism includes a first cutting device for the cutting of the band-shaped medium; the second holding mechanism includes means for conveying the band-shaped medium; and the control is constructed for the unloading of the clamping arrangement by initiating the transfer of the band-shaped medium from the first holding mechanism to the second holding mechanism, by actuating the second holding mechanism for the conveying of the band-shaped medium in output direction over a preselected distance, and by actuating the first cutting device for cutting off the band-shaped medium conveyed over the preselected distance.

8. Photographic recording device according to claim 7, further comprising a third holding mechanism located in output direction after the second holding mechanism, and a second cutting device positioned thereafter for dividing the cut-off band-shaped medium into subsections which respectively include one picture, whereby the control is constructed for actuating the third holding mechanism for the release of a clamped band-shaped medium for the transporting to the second cutting device only after the band-shaped medium was cut off by the first cutting device.

9. Photographic recording arrangement according to claim 8, wherein the second and third holding mechanisms are spaced in such a way that a band-shaped medium loop is formed there-between before the third holding mechanism is released.

10. Photographic recording device according to claim 1, wherein the first holding mechanism is moveable by the control relative to the clamping arrangement into a first loading mechanism in which a band-shaped medium captured by the first holding mechanism is clamped by the first holding mechanism and in which a transport between the first and second holding mechanisms of a band-shaped medium not captured by the first holding mechanism is made possible by the transport mechanism.

11. Photographic recording arrangement according to claim 10, wherein the first holding mechanism is in a second loading position for at least one of the loading and unloading, in which position the band-shaped medium can be supplied to the first holding mechanism by the transport mechanism in such a way that it clamps the supplied band-shaped medium by shifting into the first loading position.

12. Photographic recording device according to claim 11, wherein the transport mechanism is at least one of mechanically and electrically coupled with the first holding mechanism when the clamping arrangement is in the first preselected position in such a way that in a first coupled position the first holding mechanism is in the first loading position and the transport mechanism is not in contact with a band-shaped medium guided on the clamping track; in a second coupled position the first holding mechanism is in the first loading position and the transport mechanism is in contact with the band-shaped medium guided on the clamping track; and in a third coupled position, the first holding mechanism is in the second loading position and the transport roller is in contact with the band-shaped medium guided on the clamping track.

13. Photographic recording device according to claim 12, wherein the control governs the transport mechanism and the first holding mechanism for at least one of the loading and unloading of the clamping arrangement by moving the transport mechanism and the first holding mechanism into the first coupled position, then into the second coupled position and finally into the third coupled position.

14. Process for the automatic loading of a photographic recording device according to claim 4, comprising the steps of:
actuating the internal medium source for conveying the band-shaped medium in the second preselected position through the output opening to the second holding mechanism,
actuating the second holding mechanism for clamping the conveyed band-shaped medium,
initiating a rotational movement of the clamping arrangement for guiding the band-shaped medium along the clamping track and stopping the rotational movement when the first preselected position is reached,
transporting the band-shaped medium from the second holding mechanism to the first holding mechanism, and actuating the first holding mechanism for the clamping of the band-shaped medium transported into a capturing region of the first holding mechanism.

15. Process for the automatic loading of a photographic recording device according to claim 5, comprising the steps of:

actuating the internal medium source for conveying the band-shaped medium in the second preselected position through the output opening to the second holding mechanism, actuating the second holding mechanism for clamping the conveyed band-shaped medium, initiating a rotational movement of the clamping arrangement for guiding the band-shaped medium along the clamping track and stopping the rotational movement when the first preselected position is reached, transporting the band-shaped medium from the second holding mechanism to the first holding mechanism, and actuating the first holding mechanism for the clamping of the band-shaped medium transported into a capturing region of the first holding mechanism.

16. Process for the automatic loading of a photographic recording device according to claim 6, comprising the steps of:

actuating the internal medium source for conveying the band-shaped medium in the second preselected position through the output opening to the second holding mechanism, actuating the second holding mechanism for clamping the conveyed band-shaped medium, initiating a rotational movement of the clamping arrangement for guiding the band-shaped medium along the clamping track and stopping the rotational movement when the first preselected position is reached, transporting the band-shaped medium from the second holding mechanism to the first holding mechanism, and actuating the first holding mechanism for the clamping of the band-shaped medium transported into a capturing region of the first holding mechanism.

* * * * *

UNITED STATES PATENT AND TRADEMARK OFFICE
CERTIFICATE OF CORRECTION

PATENT NO. : 6,525,754 B2
DATED : February 25, 2003
INVENTOR(S) : Markus Landolt It is certified that error appears in the above-identified patent and that said Letters Patent is hereby corrected as shown below:

Column 4,
Line 47, "medium preferably" should read -- medium is preferably --;

Column 6,
Line 16, "up the control" should read -- under the control --;

Column 10,
Line 59, "follow ay of" should read -- following by way of --; and

Column 14,
Line 33, "firs holding" should read -- first holding --.

Signed and Sealed this

Thirteenth Day of January, 2004

JON W. DUDAS
*Acting Director of the United States Patent and Trademark Office*